US006567184B2

(12) United States Patent
Aoki

(10) Patent No.: US 6,567,184 B2
(45) Date of Patent: *May 20, 2003

(54) NETWORK SYSTEM, PRINTER, AND INFORMATION MEMORY MEDIUM

(75) Inventor: Mikio Aoki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/053,909

(22) Filed: Jan. 24, 2002

(65) Prior Publication Data

US 2002/0060809 A1 May 23, 2002

Related U.S. Application Data

(63) Continuation-in-part of application No. 09/200,460, filed on Nov. 27, 1998.

(30) Foreign Application Priority Data

Dec. 12, 1997 (JP) .............................................. 9-343218

(51) Int. Cl.[7] .............................................. G06F 13/00
(52) U.S. Cl. ..................................... 358/1.15; 358/404
(58) Field of Search ........................ 358/1.1, 1.5, 1.13, 358/1.14, 1.15, 400, 401, 402, 403, 407, 408, 435, 438, 448

(56) References Cited

U.S. PATENT DOCUMENTS 6,070,000 A    5/2000  Mori .......................... 358/1.15
6,369,907 B1 *  4/2002  Aoki .......................... 358/1.15

FOREIGN PATENT DOCUMENTS

JP            8-339276         12/1996

* cited by examiner

Primary Examiner—Mark Wallerson
(74) Attorney, Agent, or Firm—Oliff & Berridge, PLC

(57) ABSTRACT

The invention provides connecting a printer to one network, and by so doing, significantly improving its functionality as compared to a condition in which it is not connected. The network system includes a client printer and a server device which are connected through a communication line. The client printer performs an ability information inquiry to other devices on the network. Furthermore, based upon ability information which is obtained from the other devices, virtual device information in which the functionality of the printer is improved, is disclosed to a PC. The PC transmits printing data to the client printer and performs a printing request, based upon the virtual printer information. The client printer which has received the printing request which exceeds its own original ability determines a server device from which to request processing, based upon the ability information. Furthermore, the printer requests the server device to process the printing data, receives the processed printing data, and performs printing.

26 Claims, 18 Drawing Sheets

NETWORK SYSTEM, PRINTER, AND INFORMATION MEMORY MEDIUM

This is a Continuation-in-Part of application Ser. No. 09/200,460 filed Nov. 27, 1998. The entire disclosure of the prior applications is hereby incorporated by reference herein in its entirety.

BACKGROUND OF THE INVENTION

1. Field of Invention

The present invention relates to a printer that requests another device on a network to process printing data that will be printed by itself, and a network system that includes the printer, and an information memory medium to control the printer.

2. Description of Related Art

Usually, there are many cases that a printer has a low processing ability. Because of this, there are many cases that a printer driver of a computer performs processing, such as image processing, or the like, creates printing data that is printable by the printer, and allows the printer to print the printing data.

However, because the computer needs to implement a program for image processing, which has a high processing requirement, the computer has a large processing load. Because of this, a computer with a low processing ability takes more time for image processing and printing does not start immediately.

Furthermore, the speed at which the computer transmits printing data to the printer is affected by the printing speed of the printer. That is, there are problems such that a subsequent operation will not start until the computer sends all the printing data to the printer, or that the performance of the subsequent operation significantly deteriorates.

For example, a laser printer has printer memory for one page, while an ink jet printer only has printing memory for one line. Because of this, when printing is performed by an ink jet printer, there were problems such that the computer cannot be immediately released from the transmission processing, the subsequent applications cannot be smoothly operated, and the response of the computer is delayed.

Moreover, the command(s) which a printer can process is/are usually fixed. Because of this, a computer has to prepare a command (a command or a page command to control printing such as ESC/P, Postscript, or the like) according to the particular printer. Therefore, data cannot be printed to a printer which does not correspond to a command which a printer driver of the computer can prepare.

SUMMARY OF THE INVENTION

By reflecting upon these problems, the present invention connects a printer to one network, and by so doing, significantly improves the printer's functionality as compared to the state in which it is used without being connected. Specifically, the present invention provides a network system, printer and an information recording medium to control a printer, which can shorten the transmission time of printing data, increase the releasing speed of computer, relieve the processing of the printer driver of the computer, allow rapid printing even with a computer with a low processing ability, and respond to various kinds of printer commands.

The network system of the present invention includes a printer which can receive printing commands of a computer, and at least one other device. The printer has an ability information inquiry unit to inquire concerning ability information including at least one of memory capacity, a processing relating to a printer language, image processing, and an image processing execution environment, from other devices which are connected to the network, a virtual printer information determination unit which determines whether another or at least one other device is available to support a functional upgrade of the printer itself based upon the ability information which was transmitted from the other devices connected to the network in response to the inquiry for the ability information, and determines its printer's own virtual printer information, and a virtual printer information disclosing unit which discloses the virtual printer information to the computer. The other device includes an ability information reply unit that replies with ability information including at least one of the memory capacity of the machine, processing relating to a printer language, image processing, and image processing execution environment, to the printer.

Furthermore, the printer of the present invention is a printer which can receive printing commands of a computer which is connected to a network system including at least one other device, and has an ability information inquiry unit which inquires concerning ability information including at least one of memory capacity, processing relating to a printer language, image processing, and image processing execution environment, from other devices which are connected to the network. The printer also includes a virtual printer information determination unit which determines whether another device is available to support a functional upgrade of the printer itself, based upon the ability information which was transmitted from other devices which are connected to the network in response to the inquiry for the ability information, and determines its own virtual printer information, and a virtual printer information disclosing unit which discloses the virtual printer information to the computer.

Furthermore, the information memory medium of the present invention is an information recording medium on which is recorded information to control a printer which can receive printing commands of a computer and which is connected to a network system that includes at least one other device. The recorded information includes information for inquiring about ability information including at least one of memory capacity, processing relating to a printer language, image processing, and image processing execution environment, from other devices which are connected to the network, information to determine whether another device is available to support a function upgrade of the printer itself based upon the ability information which was transmitted from the other devices determine its own virtual printer information, and virtual printer information to disclose to the computer.

The printer discloses virtual printer information, showing how it operates on the network, to the computer. This virtual printer information is information which incorporates the ability of other devices which are connected to the network in addition to the original ability of the machine. Therefore, the computer can request printing processing to a printer with an improved ability. Because of this, it has an effect of reducing the limitations on when the computer sends printing data to the printer.

Here, image processing includes processing to convert the RGB components of the image data to CMYK, rendering processing to develop characters and lines into a bit map, and color conversion processing to convert colors in response to printing to various printers. The image processing ability includes the ability relating to the environment and execution program that executes processing to convert the RGB components to CMYK, rendering processing, and color conversion processing.

The ability relating to the image processing execution environment mainly refers to an environment for executing image processing and includes a memory capacity, which can execute an image processing program, OS environment, and CPU processing ability. The processing relating to the printer language includes at least one of a supporting printer language and printer language conversion program.

In the network system or the virtual printer information determination unit of the present invention, when another device which is connected to the network has a conversion function to convert at least one of a printer language and a given printer command into at least one of a printer command and a printer language that can be processed by the printer, virtual printer information is determined that indicates that at least one of the given printer command and printer language, can be processed. The virtual printer information disclosing unit then discloses the determined virtual printer information to the computer.

Thus, a printer can disclose the virtual printer information indicating that it can process another printer language, as well as its own executable printer language, to the computer. Because of this, the computer will have more degrees of freedom when the printer language to be used is selected. Therefore, for example, a computer can select a printer language among the virtual printer information in which the transmission time is the shortest.

The printer of the network system of the present invention has a processing requesting which, when a printing request containing printing data which was received from the computer exceeds the original processing ability of the printer to which the request was made, determines a server device to which to transmit the received printing data, based upon the ability information which was transmitted from other devices, and transmits the printing data to the server device in real time. A transmission requesting unit requests the transmission of printing data from the server device after the given processing, and a printing controller which controls printing, based upon received printing data that has undergone the given processing. The server device performs the given processing on the printing data which was received by the printer and has a server processor which transmits printing data after the given processing to the printer in response to the transmission request from the printer.

The printer of the present invention has a processing requesting unit which, when the printing request containing printing data which is received by the computer exceeds the original processing ability of the machine, based upon the ability information which was transmitted by other devices, determines a server device to which to transmit the received printing data and transmits the printing data to the server device in real time and requests a given processing. The printer also includes a transmission requesting unit which requests the transmission of printing data from the server device after the given processing, and a printing controller which controls printing, based upon received printing data that has undergone the given processing.

Based upon the virtual printer information which the printer disclosed, the computer transmits printing data to the printer. A printer which receives printing data which exceeds the processing ability of the printer determines a server device from which to request processing which exceeds the original processing ability of the printer, transmits the printing data to the server device, and requests processing.

According to the present invention, as the printer requests processing from another server device which is connected to a network, it is possible to realize functions which exceed the original ability of the machine. Therefore, it is possible to significantly improve the functionality of the printer without expensive upgrades to the printer itself. Furthermore, because the computer can improve the ability of the printer which outputs printing commands, printing limitations on the computer decrease.

In the network system of the present invention, the given processing includes conversion processing to convert the printing data which was received by the computer to printing data which is appropriate for the printer. The processing requesting unit determines a server device to perform conversion processing, based upon printing data which was received from the computer and the ability information relating to a printer-related function including at least one of processing relating to a printer language, and image processing. The server processor includes a conversion processor to convert the printing data which is received by the printer to printing data which is appropriate for the printer.

In the printer of the present invention, the given processing includes conversion processing to convert the printing data which was received by the computer to printing data which is appropriate for the printer itself. The processing requesting unit determines a server device to perform conversion processing, based upon printing data which was received from the computer and the ability information relating to a printer related function including at least one of processing relating to a printer language, and image processing.

Based upon the virtual printer information which the printer discloses, the computer transmits printing data to the printer. A printer which receives printing data in which appropriate image processing has not been performed, or printing data which cannot be printed by the original processing ability of the printer, determines another server device from which to request conversion processing to convert the data into appropriate printing data from the received ability information. The printing data is then transmitted to the server device and processing is requested.

By using its own processing program, the server device converts the received printing data to printing data which is appropriate for the printer to print. Thus, the printer which receives the converted printing data performs printing.

According to the present invention, as the printer requests processing from another server device(s) which is/are connected to a network, it is possible to realize a function which exceeds the printer's original processing ability. For example, while a printer can usually only process fixed printer commands, if there is a printing language which cannot be processed by the printer, it is possible to print data by having a conversion performed by another device. Furthermore, because the ability of a printer to which the computer outputs printing commands can be improved, printing limits on the computer decrease.

When the given processing is requested, the processing requesting unit of the network system of the present invention transmits its own device information to the server device. The conversion processor converts the printing data to printing data which is appropriate for the printer, based upon the device information.

The processing requesting unit of the printer of the present invention transmits its own device information to the server device when the given processing is requested. The device information may be information to specify a machine type of the printer, and it may also be, for example, the ID of the printer.

In the network system of the present invention, the given processing includes memory processing which stores the printing data which was received from the computer. The processing requesting unit determines a server device to perform the memory processing, based upon the ability information relating to memory capacity. The server processor receives printing data which was transmitted from the printer and has a memory processor which stores the received data in its own memory.

In the printer of the present invention, the given processing includes memory processing which stores the printing data which was received from the computer. The processing requesting unit determines a server device to perform the memory processing, based upon the ability information relating to memory capacity.

For example, an ink jet printer has a printing memory for only one line. Because of this, in general, when data is transmitted from a computer to a printer, the computer has to perform a transmission corresponding to the printing speed of the printer. Therefore, the release speed of the computer can be delayed. For example, a subsequent application cannot be smoothly operated, and/or the computer reaction can be delayed.

However, in the present invention, because the printer transmits the received data to a server device with a large memory capacity, when the computer transmits data, the computer is not limited by the printing speed of the printer. Because of this, the time period of the transmission of data to the printer by the computer can be shortened and the speed of releasing the computer can be improved.

The network system or the processing requesting unit of the printer of the present invention stores printing data which is transmitted by the computer until its printing memory no longer has space. When there is no longer space in its own printing memory, the received printing data is transmitted to the server device in real time. The transmission requesting unit requests the transmission of printing data which it previously transmitted to the server device, according to space in the printing memory due to printing. The printing controller sequentially receives printing data which was previously transmitted, performs control so as to store the data in its own printing memory, and executes printing simultaneously with the transmission of printing data from the server device.

According to the present invention, printing data which cannot be saved in the printing memory of the printer due to space availability is transmitted to the server device and is received again as soon as the printing memory is available for printing. Therefore, it is possible to shorten the processing time because printing data is transmitted to the server device as it is being printed.

In the network system of the present invention, the given processing includes image processing of the printing data which was received from the computer. The printer further has an image processing program memory which stores an image processing program to perform image processing on the printing data which is appropriate to its own device. The processing requesting unit determines a server device with an execution environment for the image processing, based upon the ability information relating to the image processing execution environment, and transmits the image processing program to perform image processing of the printing data to the server device. The server processor receives the image processing program to perform image processing of the printing data which was transmitted by the printer, and includes an image processing execution unit to perform image processing of the printing data by using the image processing program.

In the printer of the present invention, the given processing includes image processing of the printing data which was received from the computer, the printer further includes an image processing program memory which stores an image processing program to perform image processing on the printing data which is appropriate to its own device. The processing requesting unit determines a server device with an image processing execution environment based upon the received ability information.

Image processing, such as rendering processing and color conversion processing vary, depending upon the printer device. Therefore, if a server device to which processing was requested is made to have an image processing program, memory efficiency is unfavorable because the server device must have a large amount of image processing programs corresponding to all the devices.

Therefore, memory efficiency is better when the client side which requests processing, has the best image processing program for itself and hands over the data and the image processing program together when requesting processing.

Here, image processing includes processing to convert the RGB components of the image data to CMYK, rendering processing to develop characters and lines to a bit map, and color conversion processing to perform color conversion according to the printer type.

"Image data" refers to data showing the content which is displayed, for example, on a display screen, and includes text data. It includes data to which none of conversion from RGB to CMYK, rendering processing, and image processing, such as color conversion, have not been performed, and also includes data to which some or all of the above processing have been performed.

It is also acceptable for the computer to perform image processing by observing the virtual printer information of the printer, creating printing data including printer commands or the like, and transmitting the printing data to the printer. Furthermore, if the printer has an image processing ability, it is also acceptable to transmit the image data to the printer prior to performing image processing.

Furthermore, if a server device has the same image processing program as the image processing program which the printer is about to transmit, it is acceptable to have a structure in which the version information is checked, and, for example, when it is indicated that the version information of the image processing program with the printer is newer, to transmit the program.

When the printer of the network system of the present invention is itself connected to the network, when a new device is connected to the network, and/or when there is an ability information inquiry from the computer, the ability information inquiry is performed with respect to other devices which are connected to the network.

When the printer is connected to the network, by performing an inquiry, it is possible to display virtual printer information promptly to the computer. When a new device is connected to the network, by performing an inquiry, it is possible to display virtual printer information which incorporates the ability of the new device, displaying the latest virtual printer information.

The printer of the network system of the present invention or the printer of the present invention has an ability information memory which stores the ability information in relation to each device on the network.

By so doing, when the ability information of the other server devices is needed, it is possible to obtain the necessary ability information by simply referring to the ability information memory. Therefore, inquiries are not needed and the processing time can be shortened.

In the network system or the printer of the present invention, the printing data includes image data, or image data and printer commands.

The printer of the present invention further includes an ability information reply unit which, in response to the ability information inquiry from another device connected to the network regarding at least one of memory capacity, processing relating to the printer language, image processing, and image processing execution environment, replies with ability information to the printer regarding at least one of its own memory capacity, processing related to the printer language, image processing, and image processing environment. The printer also includes a server processor which performs given-processing of printing data received from another printer which is connected to the network and transmits the processed printing data to the other printer in response to a transmission request from the other printer.

According to the present invention, the printer can be used as a server device as needed.

The server processor of the printer of the present invention includes a conversion processor which converts the printing data which is received from another printer to printing data which is appropriate for the other printer. The conversion processor converts the printing data to printing data based upon the device information which was received from the other printer.

The server processor also includes a memory processor which receives printing data which was sent by the printer and stores the data in its own memory, and an image processing execution unit which receives the printing data and image processing program which are sent by the other device and performs image processing on the printing data.

DETAILED DESCRIPTION OF PREFERRED EMBODIMENTS

Next, the present invention is described in detail, based upon the figures.

(1) First Embodiment

A characteristic of the present invention is to improve the functionality related to a printer by connecting the printer to a network. This functionality can be realized for a printer (hereafter referred to as a client printer) which receives a printing command from a personal computer (hereafter referred to as PC) requests another device on the network to perform conversion processing on the printing data which is appropriate for the printer, receives the converted data and performs printing.

Figure 1:
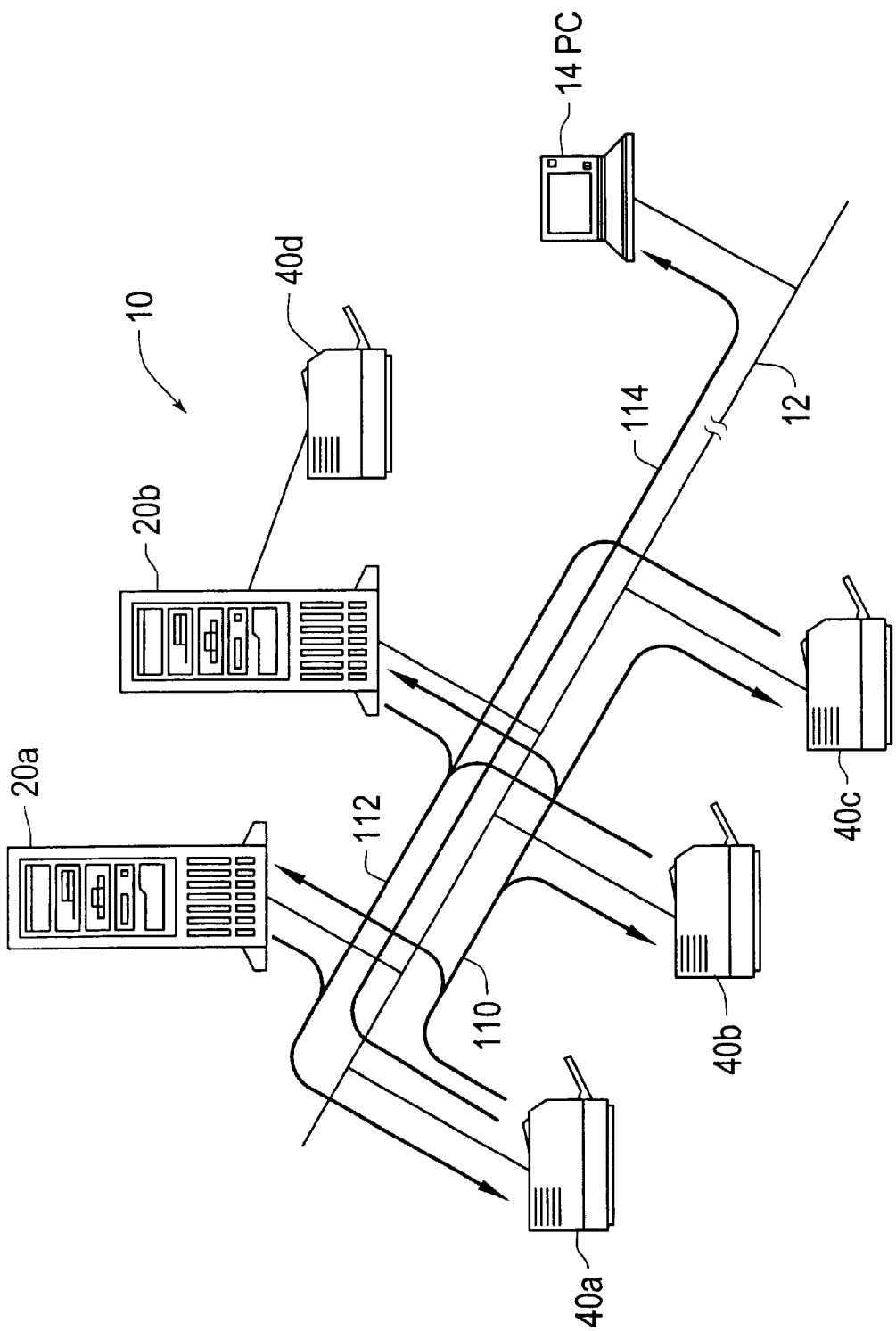
FIG. 1 is a diagram of a network system related to the first embodiment.
Figure 2:
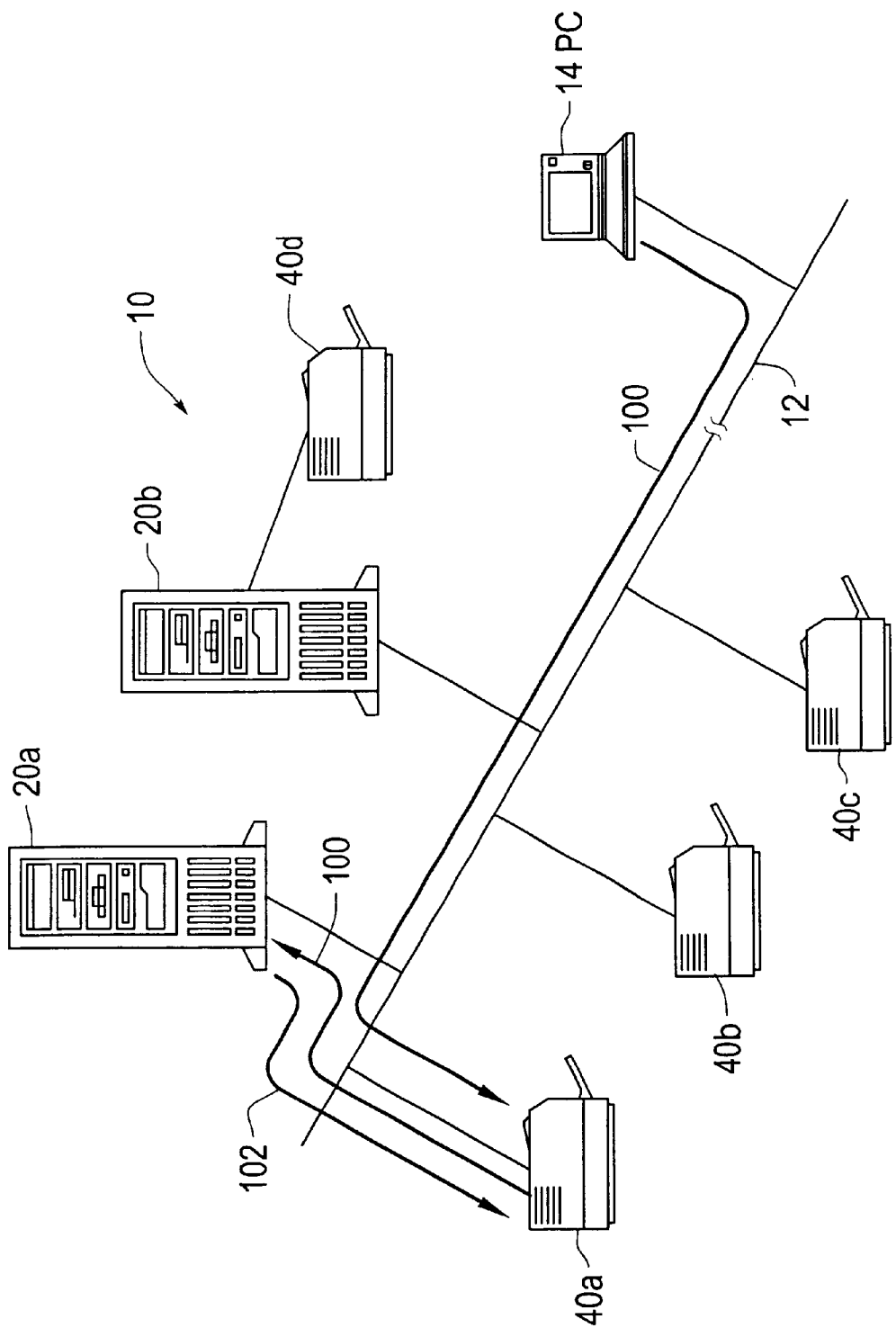
FIG. 2 is a diagram of the network system of the first embodiment.

FIGS. 1 and 2 show an exemplary structure of the first embodiment of the printer of the present invention, and a network system to which the printer is connected. The network system 10 of the present embodiment is connected to a plurality of servers 20a and 20b and a plurality of printers 40a, 40b, 40c, or the like through the communication line 12. Furthermore, there are also printers, such as 40d, which are directly connected to the server 20b. Moreover, the structure is such that the printers 40 can be increased as needed with respect to the communication line 12 and the server 20.

In addition, the network system 10 is connected to PC 14 through the communication line 12. The PC 14 has access to an external network system, such as the Internet through the communication line 12 and can receive information data, such as characters, still images, moving images, and sound. Furthermore, the PC 14 can also receives image data through various inputting/outputting media, or receive image data directly.

In the present embodiment, as shown in FIG. 1, the printer 40a which is connected to the network system performs a printer-related ability information inquiry 110 regarding at least one of processing related to the printer language and image processing with regard to the other devices 20a, 20b, 40b, 40c, or the like, which are connected to the network. The other devices 20a, 20b, 40b, 40c or the like, which are connected to the network reply with the printer-related ability information 112 in response to the printer's 40a ability information inquiry.

Based upon the ability information 112 which is sent from the other devices which are connected to the network in response to the ability information inquiry of the printer-related functions, the printer 40a determines whether one or more other devices which support an improvement of its own functions is available, and determines its own virtual printer information. Furthermore, the virtual printer information 114 is disclosed in response to a request from PC 14.

When PC 14 receives the virtual printer information 114 and determines that it is possible to print information, as shown in FIG. 2, the printing data 100 including a printer command which was created by its own printer driver is transmitted to the printer 40a. The printer 40a which receives the printing data 100 determines a server device from among a plurality of printers 40 and servers 20 which performs processing to convert the received printing data 100 to printing data 102 which is appropriate for its own printer. For example, when the server 20a is determined as the server device, the printer 40a transmits the printing data 100 to the server 20a and requests conversion processing. When the printing data 100 is received, the server 20a performs conversion processing. Furthermore, in response to a transmission request from the printer 40a, the server 20a transmits the converted printing data 102 to the printer 40a. The printer 40a receives the converted printing data 102 performs a printing output.

Figure 3:
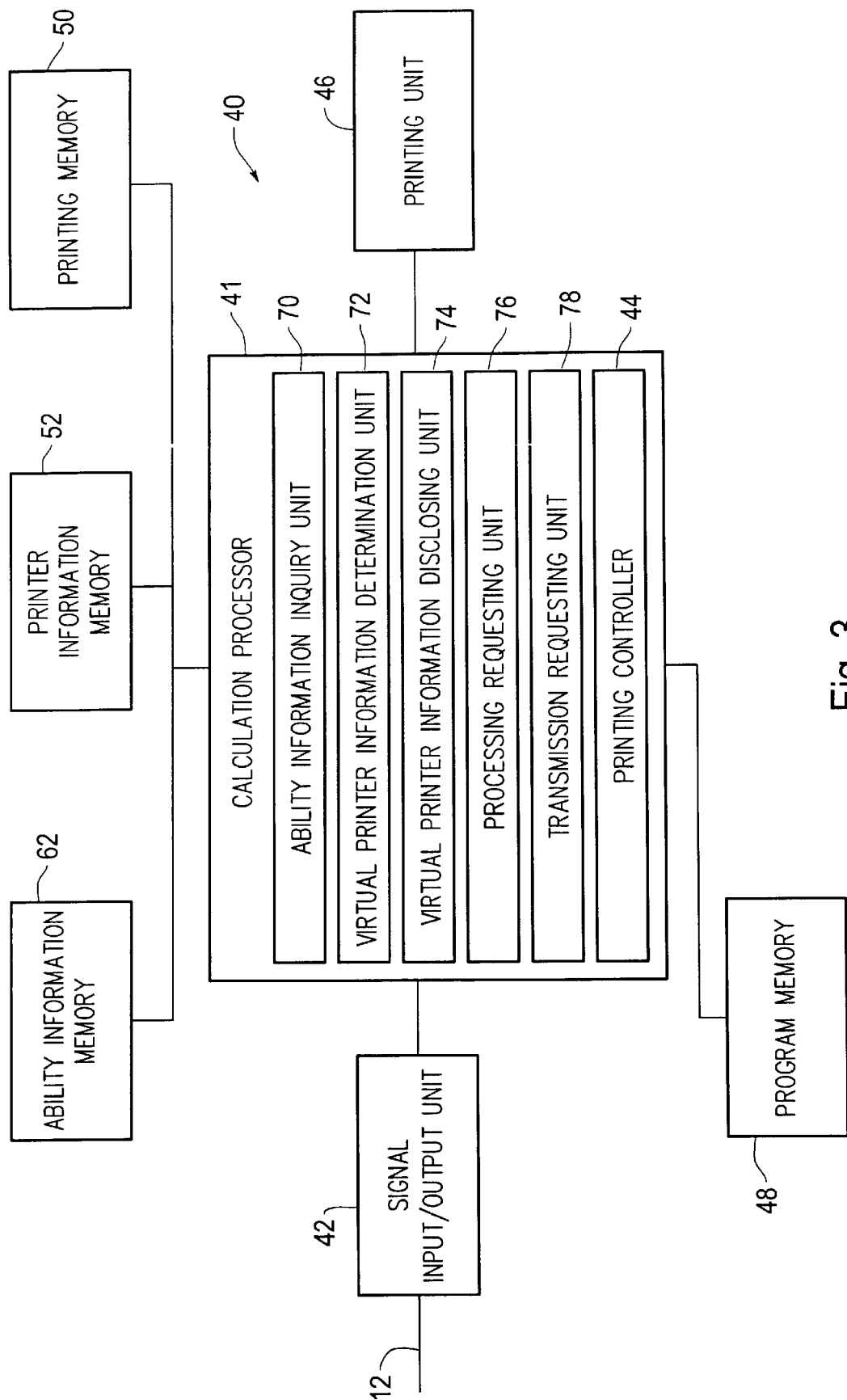
FIG. 3 is a block diagram of the client printer of the first embodiment.

FIG. 3 shows a block diagram of a device which functions as a client printer, such as the printer 40a. The client printer of the present embodiment is formed by a signal input/output unit 42 which is connected to the communication line 12, a calculation processor 41 which is formed by using a CPU or the like, a program memory 48 in which a program to operate as a printer, such as an ESC/P processing program is stored, a printing memory 50 to store the printing data 100 which is transmitted from PC 14, a printer information memory 52 in which an ID to specify a model number (type of machine name) of its own printer is stored, an ability information memory 62 in which information regarding at least one of the memory capacity of other devices on the network, their processing relating to the printer language, their image processing, and their image processing execution environment is stored, and a printing unit 46 which performs actual printing based upon the printing data.

The calculation processor 41 is operated based upon the program which is stored in the program memory 48 and functions as an ability information inquiry unit 70, a virtual printer information determination unit 72, a virtual printer information disclosing unit 74, a processing requesting unit 76, a transmission requesting unit 78, and a printing controller 44.

The ability information inquiry unit 70 inquires about the ability information regarding at least one of the memory capacity, the processing relating to the printer language, the image processing, and the image processing execution environment with respect to other devices connected to the network. Furthermore, the ability information from other devices that is received in response to the inquiry is stored in the ability information memory 62. Furthermore, inquiries are performed when the client printer itself is connected to the network and/or when a new device is connected to the network.

In the present embodiment, the ability information inquiry unit 70 inquires about ability information relating to printer-related functions, including at least one of processing relating to the printer language and image processing, from other printers on the network, and the ability information memory 62 stores the ability information relating to the printer-related functions.

The virtual printer information determination unit 72 determines whether other devices which support an improvement of its own functionality are available, based upon the ability information which was transmitted from the other devices which are connected to the network in response to the ability information inquiry, and determines its own virtual printer information.

The virtual printer information disclosing unit 67 discloses the virtual printer information 114 in response to a request from the PC 14.

When the printing request containing the printing data which is received from the PC 14 exceeds the original processing ability of the machine, the processing requesting unit 76 determines a server device to which to transmit the printing data which was received, based upon the ability information which is stored in the ability information memory 62. Furthermore, the printing data and the device information of the machine are transmitted to the server device in real time, and the given processing is requested. In the present embodiment, the given processing is conversion processing to convert the printing data which was received from PC 14 to printing data which is appropriate for the client printer. Because of this, the processing requesting unit 76 determines a server device to perform conversion processing to convert the data to printing data which is appropriate for the client printer, based upon the printing data which was received from PC 14 and the ability information concerning the printer-related functions.

The transmission requesting unit 78 requests the server device to transmit the processed printing data. The printing controller 44 writes printing data which is transmitted from the server device to the printing memory 50, which functions as a buffer, and is structured so as to sequentially print out the data by controlling the printing unit 46.

Figure 4:
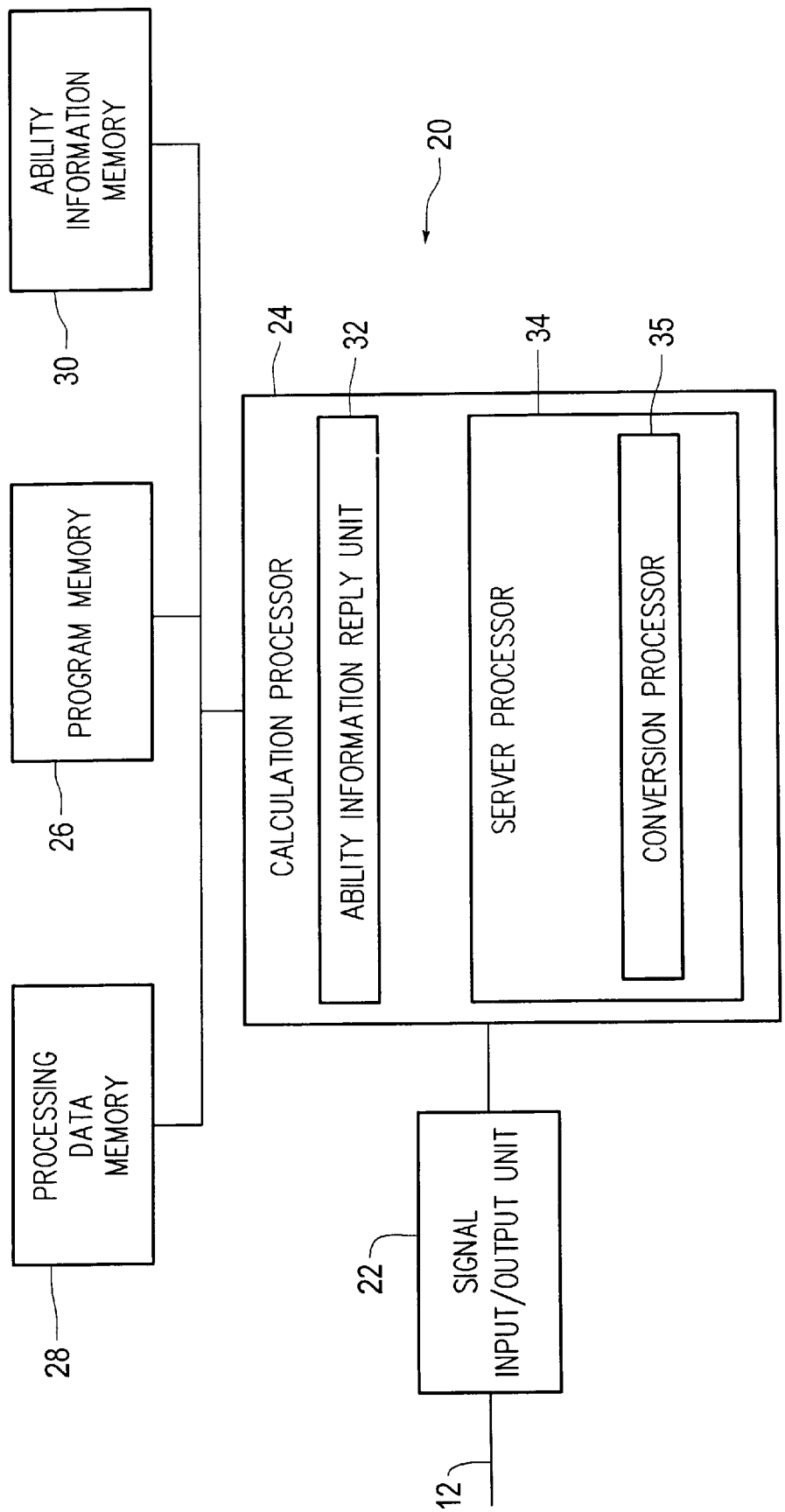
FIG. 4 is a block diagram of the server device of the first embodiment.

FIG. 4 shows a block diagram of a device which functions as a server device, such as the server 20a. The server device of the present embodiment is structured by a signal input/output unit 22 that performs the communication of the data through the communication line 12, a calculation processor 24 which is structured by using a CPU, or the like, a program memory 26 in which various operation programs are stored, a processing data memory 28 which stores at least one of processed printing data and printing data for which a processing request has been received from the client printer, and an ability information memory 30 which stores printer ability information unique to various types of printers.

In the present embodiment, at least one of printing data for which a conversion request is received from the client printer and processed printing data, is stored in the processing data memory 28.

In the program memory 26, a program is stored which performs processing relating to a printer language for printing data to which the data conversion processing was requested, and data conversion processing, such as image processing.

Here, in the ability information memory 30, version information of the program which was stored in the program memory 26 and a printer ID, or the like, which is the device information to specify a type of printer corresponding to the program, is stored. The ID which is the device information to specify a type of printer corresponding to the program, is the device information of a printer which is appropriate for printing the processed data if it is an image processing program, and is the device information, or the like, of the printer which can print by printing data using the printer commands, if it is printer language conversion processing.

The calculation processor 24 is operated based upon the operation program which is stored in the program memory 26 and functions as the ability information reply unit 32 and the server processor 34.

In response to the ability information inquiry from the client printer, the ability information reply unit 32, replies with ability information regarding at least one of its own memory capacity, processing concerning the printer language, image processing, and image processing execution environment, to the client printer.

In the present embodiment, the ability information of the printer related function, which is stored in the ability information memory 30, including at least one of image processing and processing relating to the printer language, is replied to the client printer. The ability information of the printer-related function is, for example, version information, information concerning availability of a program which performs image processing, and processing relating to the printer language, or the like.

The server processor 34 performs processing of the printing data which is received from the client printer and controls so as to transmit the printing data that has undergone the given processing, to the printer in response to the transmission request from the printer.

In the present embodiment, the conversion processor 35 which performed the given processing is included. Based upon the printer device information and the printing data, the conversion processor 35 refers to the ability information memory 30 and determines a program which is used for conversion processing of the printing data which was received by the client printer. Furthermore, by using an appropriate program which is stored in the program memory 26, conversion processing is performed on the printing data.

Figure 5:
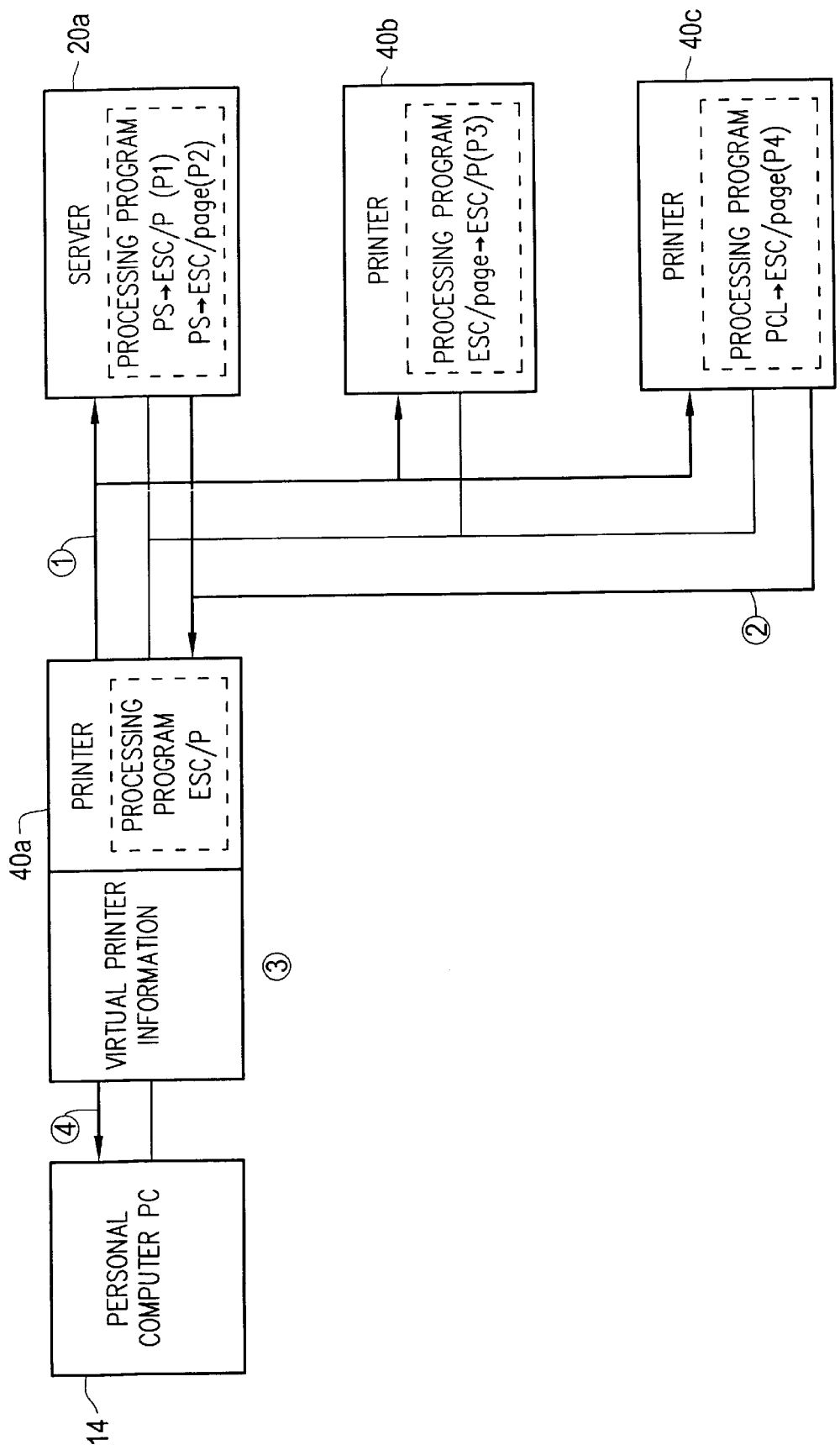
FIG. 5 is a diagram of a detailed operation example of the first embodiment.
Figure 6:
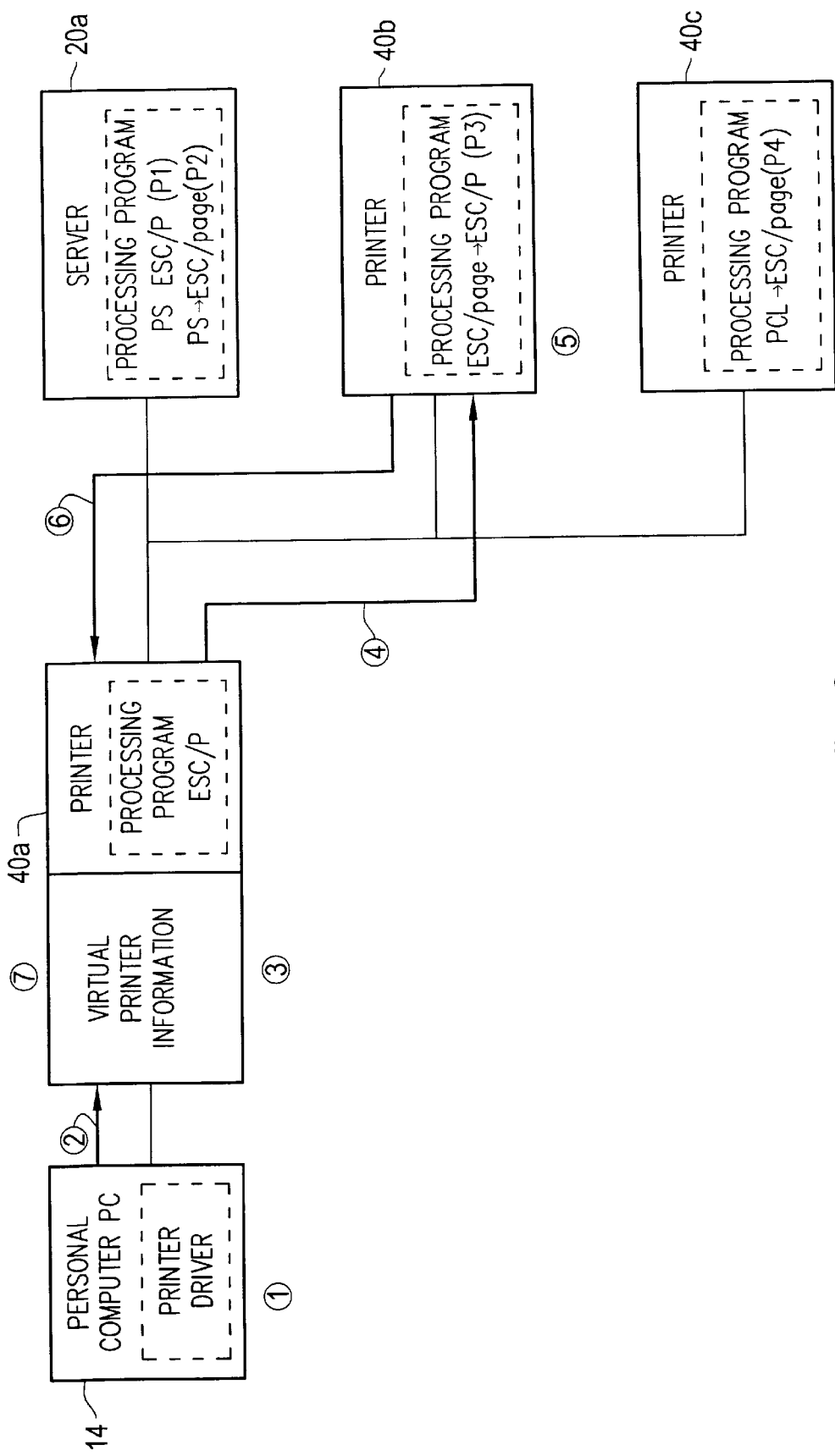
FIG. 6 is a diagram of a detailed operation example of the first embodiment.
Figure 7:
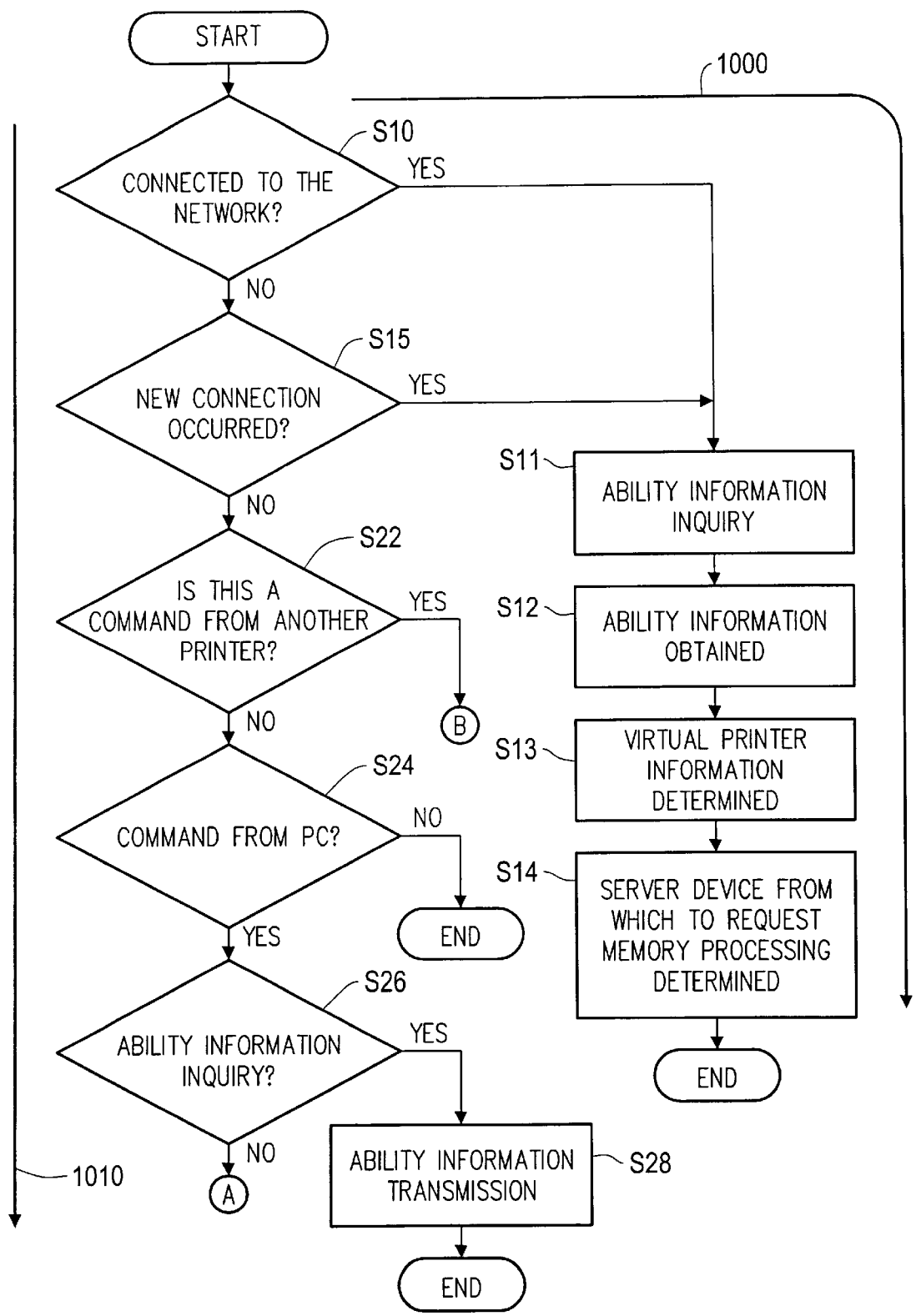
FIG. 7 is a flowchart of a detailed operation of the present invention.
Figure 8:
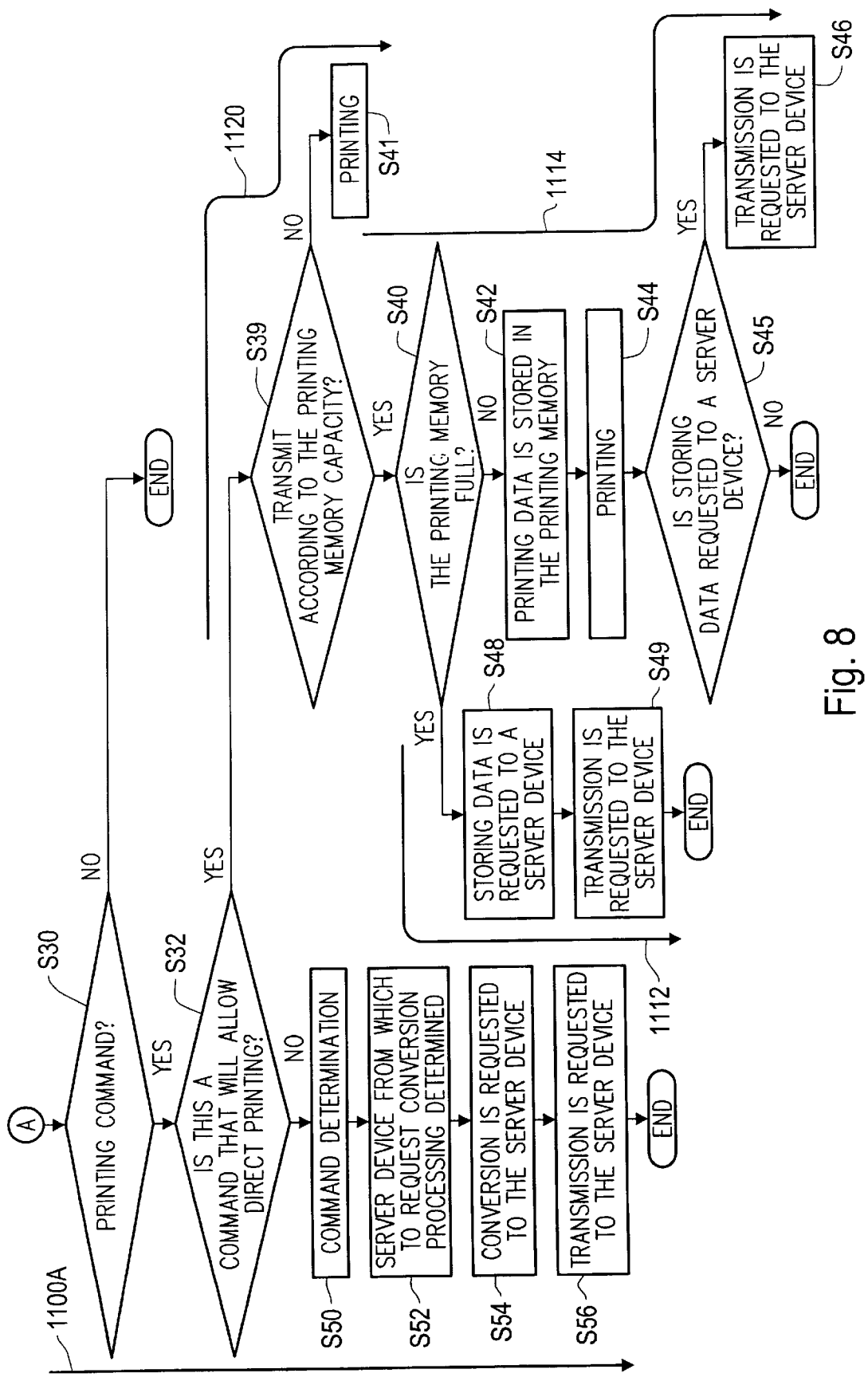
FIG. 8 is a flowchart of a detailed operation of the present invention.
Figure 9:
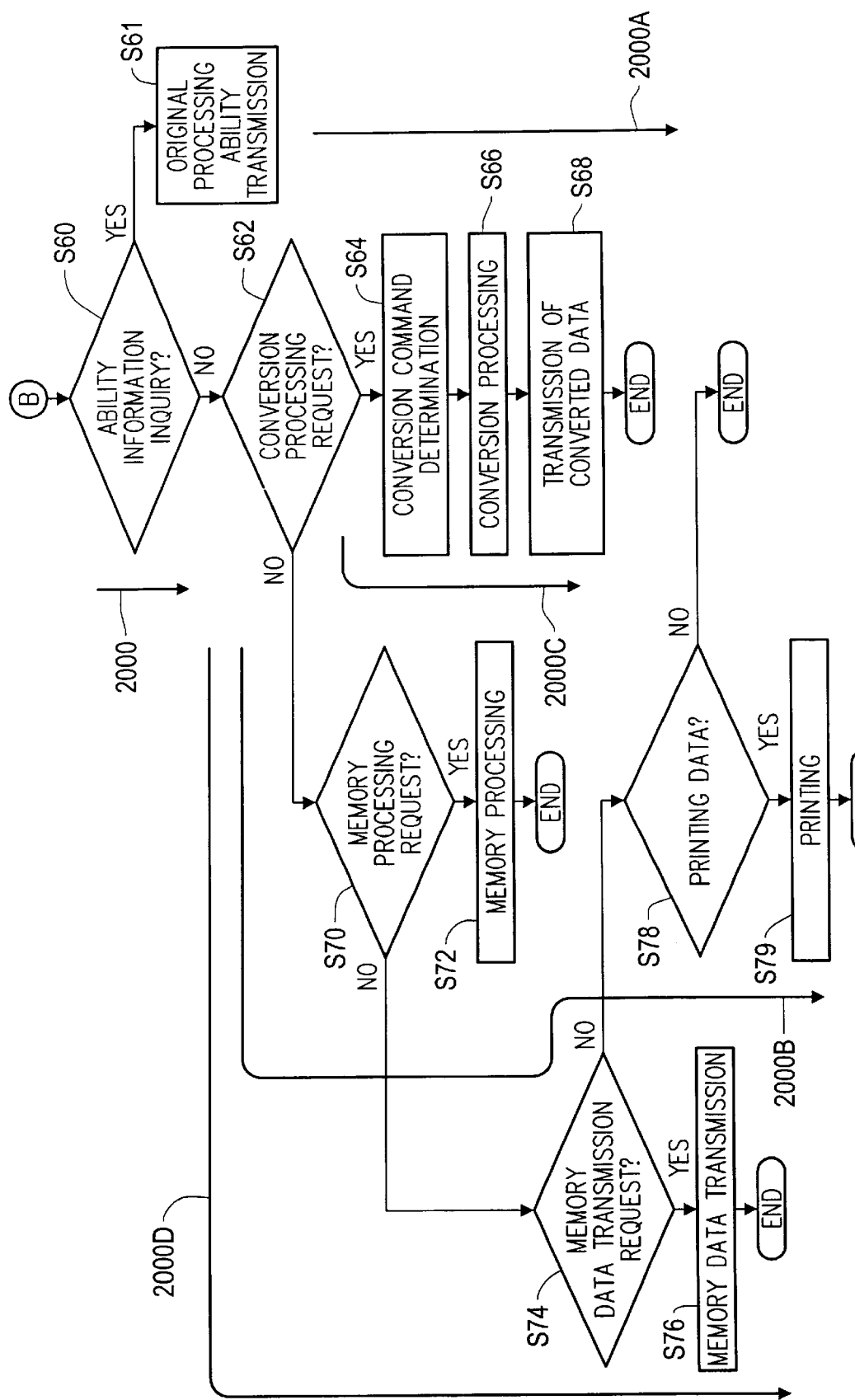
FIG. 9 is a flowchart explaining a detailed operation of the present invention.

Next, further detailed operation examples of the printer and the network system 10 of the present embodiment are explained. FIGS. 5 and 6 are diagrams of the further operation examples of the printer and the network system 10 of the present embodiment. FIGS. 7, 8, and 9 are flowcharts explaining the operation of the printer of the present embodiment. Furthermore, the flowcharts of FIGS. 7, 8 and 9 show the printing operation when the printer functions as both a client printer and as a server device. Because of this, the flowcharts of FIGS. 7, 8 and 9 show the printing operation in which the printer behaves like a client printer and a server device.

FIG. 5 is an example in which the client printer determines the virtual printer information and discloses it to PC 14. The printer 40a which becomes a client printer is, for example, an ESC/P printer (i.e., its own original ability). In this instance, prior to being connecting to the network, the printer functions as an ESC/P printer only. Therefore, when the PC 14 wants to print to the printer 40a, it is necessary to transmit printing data that includes printer commands which the ESC/printer can process.

However, by connecting the printer 40a to the network 10, it is possible to disclose the virtual printer information, with the improved functionality to the PC 14. The operation of the printer 40a when the determination and disclosure of the virtual printer information is performed, is shown in flows 1000 and 1010 of FIG. 7.

① First of all, the ability information inquiry unit 70 of the printer 40a performs the printer-related ability information inquiry to other devices on the network (step S11).

② The printer 40a obtains the ability information from other devices on the network in response to the inquiry (step S12). For example, in FIG. 5, ability information is obtained indicating that the server 20a has a processing program (P1) to convert printing data corresponding to PS to printing data corresponding to ESC/P and a processing program (P2) to convert printing data corresponding to PS to printing data corresponding to ESC/page, the printer 40b has a processing program (P3) to convert printing data corresponding to ESC/page to printing data corresponding to ESC/P, and the printer 40c has a processing program (P4) to convert printing data corresponding to PCL to printing data corresponding to ESC/page.

③ Based upon the ability information of the printer-related function, the virtual printer information determination unit 72 of the printer 40a determines whether other devices that support an improvement of the functionality of the machine are available, and determines the printer's own virtual printer information (step S13). In FIG. 5, the printer 40a is an ESC/P printer, so if a processing program to convert a given printer command, a printer language, or the like, to printing data corresponding to ESC/P is available, virtual printer information is determined which indicates that it is a printer which can process the given printer command, printer language, or the like. Therefore, according to the processing program (P1) and the processing program (P3), the printer 40a can determine virtual printer information indicating that it can function as a PS printer and as an ESC/page printer.

④ Then, if there is an inquiry of the printer-related function ability information from PC 14, the virtual printer information is disclosed to PC 14 (steps In FIG. 6, an example is shown in which a server device is requested to convert printing data which was received from the client printer PC 14, and the converted printing data is printed out.

The operation of the printer 40a when the conversion request is performed is shown in the flow 1100A of FIG. 8, the operation of a server device which has received a conversion request is shown in 2000A in FIG. 9, and the operation to print the converted data by the printer 40a, is shown in the flow 1120 of FIG. 8.

① Based upon the function of its own printer driver and the virtual printer information of the printer 40a, PC 14 determines a printer command when printing data is transmitted to the printer 40a.

② The printing data including a printer command is created in the printer driver and is transmitted to the printer 40a. For example, printing data which can be printed by an ESC/page printer is transmitted.

③ The printer 40a which has received the printing data determines whether the received printer command is a command which the printer 40a can directly print. Here, the printer 40a can only print when the printing data corresponding to ESC/P is received.

④ However, because the information which has been received is printing data which can be printed by an ESC/page printer, it cannot be directly printed. Therefore, based upon the ability information, the processing requesting unit 76 determines a server device from which to request conversion processing to convert the printing data corresponding to ESC/page to printing data which can be printed by the ESC/P printer, and requests conversion processing by transmitting its own device information and the printing data which was received, to the server device. Here, conversion processing is requested by transmitting data to the printer 40b with a processing program (P3) to convert the printing data corresponding to ESC/page to printing data corresponding to ESC/P (steps S50–S54).

⑤ The conversion processor 35 of the printer 40b, which is the server device to which the conversion processing is requested, determines conversion processing using the processing program (P3), based upon the printer device information and the printing data which were transmitted from the printer 40a. Conversion processing in which the printer 40*a* converts the received printing data to printing data which can be directly printed, is performed by using the processing program (P3). Here, the printing data corresponding to ESC/page is converted to printing data corresponding to ESC/P (steps S62–S66 of FIG. 9).

⑥ Moreover, the conversion processor 35 transmits the converted printing data to the printer 40*a* in response to a transmission request (step S56 of FIG. 8) from the transmission requesting unit 78 of the printer 40*a*.

⑦ The printer 40*a* which receives the converted printing data performs printing, based upon the printing data (steps S39, S49 of FIG. 8).

According to the present embodiment, the printer 40*a* discloses virtual printer information to PC 14, showing how it can function on the network. The virtual printer information incorporates the ability of the other devices connected to the network, in addition to its own original ability. Because of this, by connecting the printer to the network, it is possible to improve its functionality beyond its original ability.

Furthermore, by requesting processing from other server devices which are connected to the network, the client printer can realize a functionality beyond its own original ability. Thus, the printer's functionality is significantly improved without making additional expenditures to the printer itself. Moreover, for the server device, any device that functions as a server device, for example, a server or a printer, is acceptable.

Furthermore, PC 14 can request printing processing from an upgraded printer. Because of this, there is effectiveness such that limits can be reduced when the computer transmits printing data to the printer.

(2) Second Embodiment

The characteristic of the present embodiment is to improve the functions concerning memory capacity by connecting the printer to the network. The functions can be realized by a printer (hereafter referred to as a client printer) which has received a printing command from a personal computer (hereafter referred to as PC) requests printing data memory processing of received printing data to another device (hereafter referred to as a server device) on the network, then receives the data which is stored in the server device, and performs printing.

Figure 10:
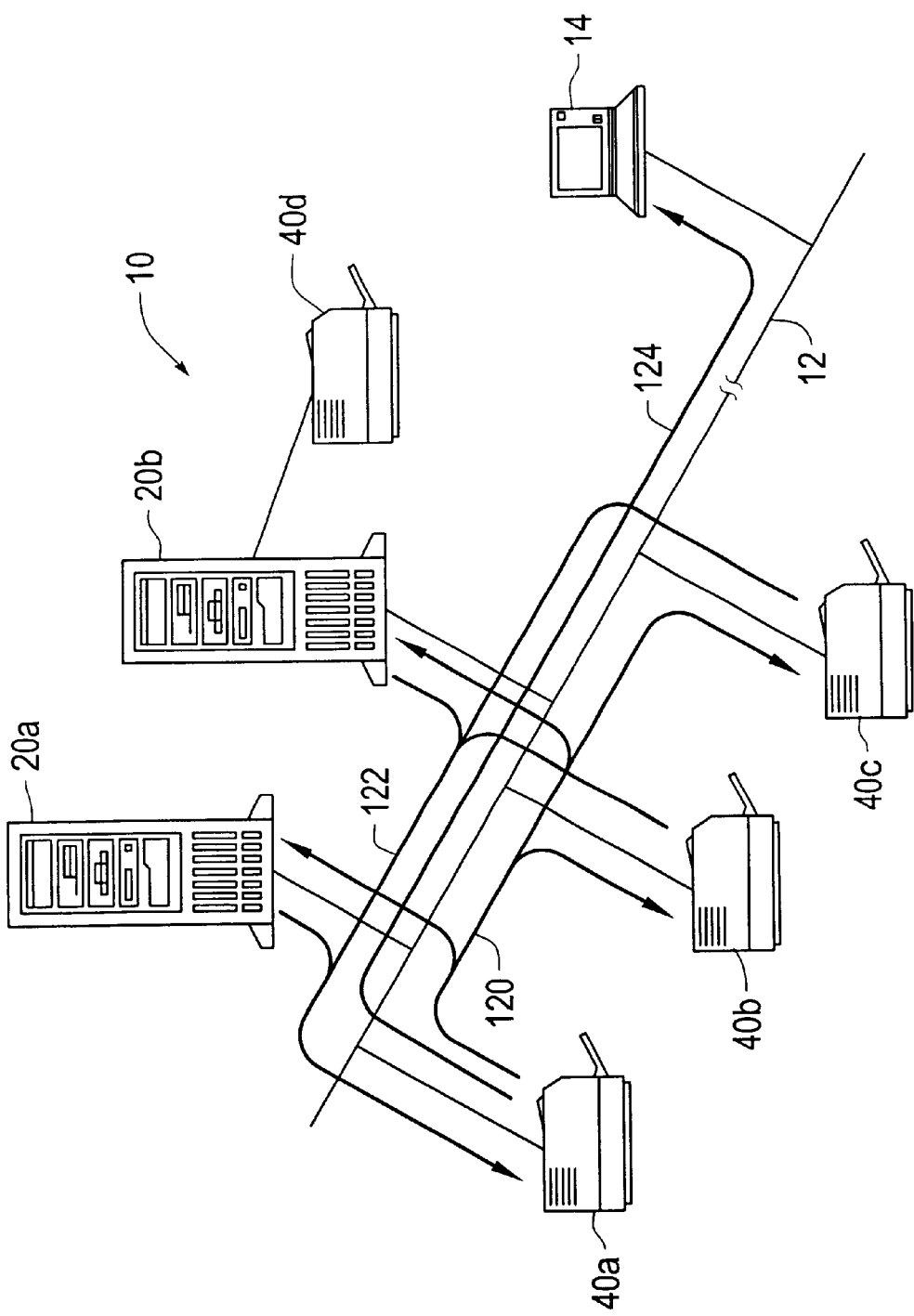
FIG. 10 is a diagram of the network system of the second embodiment.
Figure 11:
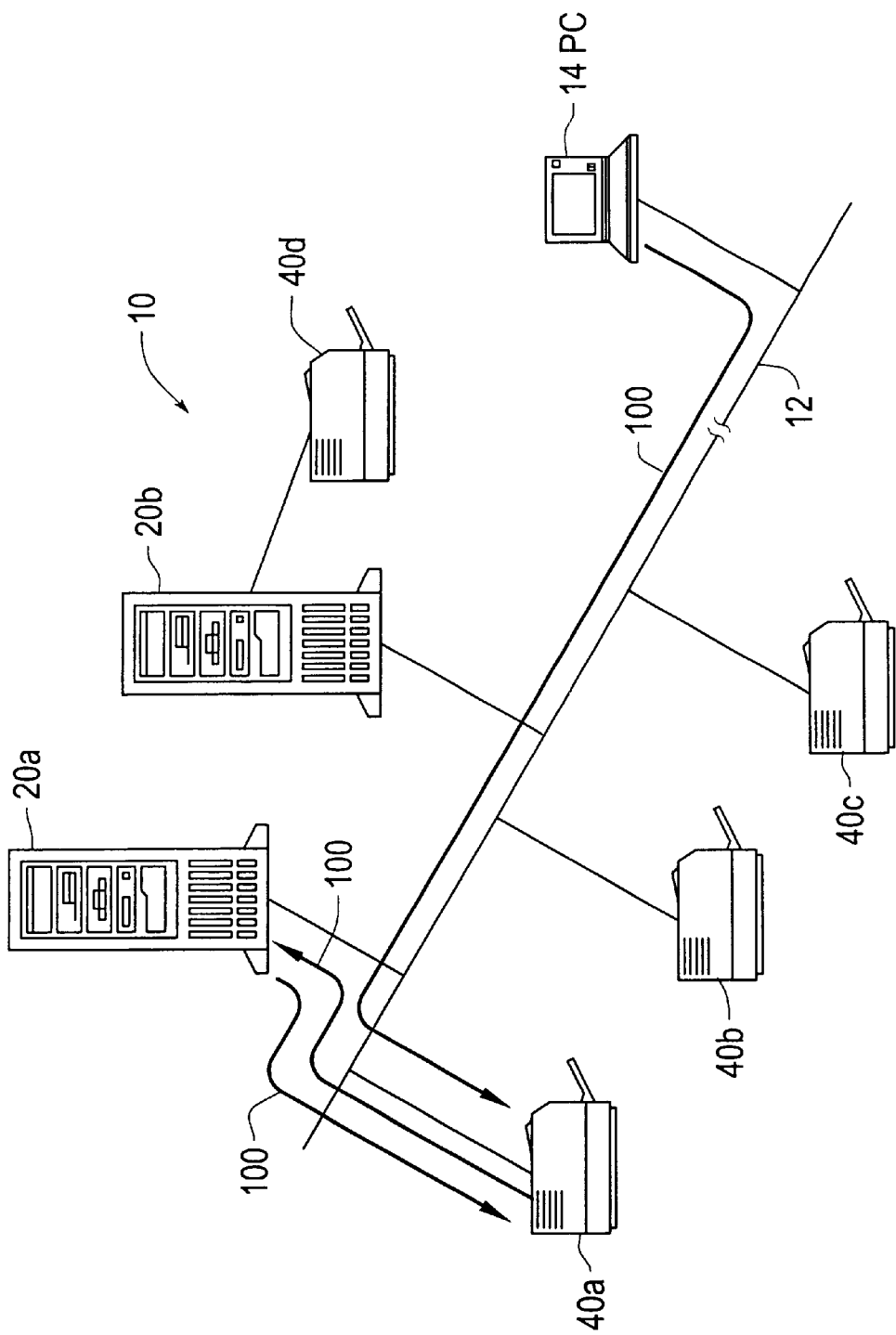
FIG. 11 is a diagram of the network system of the second embodiment.

FIGS. 10 and 11 show a schematic structure of the second embodiment of the printer of the present invention, and a network system to which the printer is connected. The equipment structure in FIGS. 10 and 11 is basically the same as the one in FIGS. 1 and 2.

In the present embodiment, the client printer which has received a printing command from PC 14 performs processing to transfer printing data to a server device with a large memory capacity, in which the printing data which was received, is stored. Therefore, a device with a large memory capacity in which the printing data which is received can be stored must be connected to the network system.

The client printer is defined as the printer 40*a*. As shown in FIG. 10, the printer 40*a* performs an ability information inquiry 120 concerning the memory capacity with respect to other devices 20*a*, 20*b*, 40*b*, 40*c*, or the like, which are connected to the network. The other devices 20*a*, 20*b*, 40*b*, 40*c*, or the like, which are connected to the network reply with ability information 122 concerning their own memory capacities to the printer 40*a* in response to an ability information inquiry.

Based upon the ability information which is transmitted from the other devices concerning the memory capacity, the printer 40*a* determines a server device from which to request memory processing with sufficient memory capacity to store printing data which is transmitted from PC 14. The server device is defined as 20*a*. Furthermore, virtual printer information 124 indicating the memory capacity of the server device 20*a* as the memory capacity which can be stored by the printer 40*a* itself, is disclosed to the PC14.

When PC 14 receives the virtual printer information 124 and determines that it is possible to print data at high speed, as shown in FIG. 11, the printing data 100 including a printer command which was created by the PC's own printer driver, is transmitted to the printer 40*a*. Furthermore, for the convenience of explanation, it is assumed that the printing data is transmitted that includes a printing command which can be printed according to the original ability of the printer 40*a*.

The printer 40*a* which has received the printing data 100 transfers the received printing data to the server 20*a* and requests memory processing.

When the server 20*b* receives the printing data 100, it stores the data in its own memory. Moreover, in response to a transmission request from the printer 40*a*, the printing data 100 is transmitted to the printer 40*a*. The printer 40*a* prints out the received printing data 100.

Figure 12:
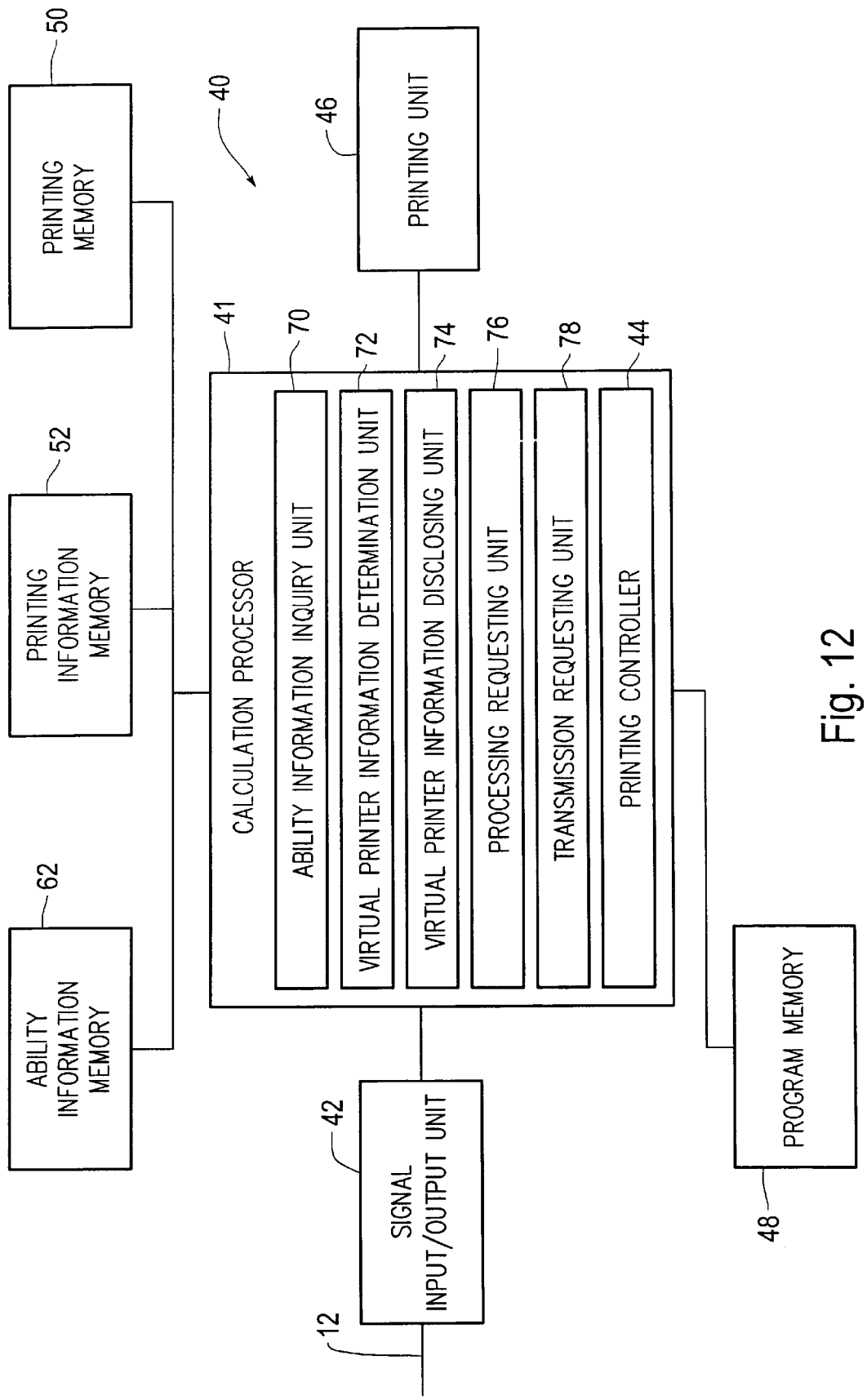
FIG. 12 is a block diagram of the client printer of the second embodiment.

FIG. 12 shows a functional block diagram of a device which functions as a client printer, such as the printer 40*a*. In FIG. 12, the same numbers are used for parts with the same function as in the function block diagram of the client printer of FIG. 3.

The client printer of the present embodiment is structured by a signal input/output unit 42 which is connected to the communication line 12, a calculation processor 41 which comprises a CPU, or the like, a program memory 48, a printing memory 50, a printer information memory 52, an ability information memory 62, and a printing unit 46 which performs the actual printing based upon the printing data.

Here, the printing memory 50 stores the printing data for only one line, for example, when the client printer is an ink jet printer. The printing memory 50 stores the printing data for one page, as in the case of a laser printer.

The calculation processor 41 is operated based upon a program which is stored in the program memory 48, and functions as an ability information inquiry unit 70, a virtual printer information determination unit 72, a virtual printer information disclosing unit 74, a processing requesting unit 76, a transmission requesting unit 78, and a printing controller 44.

In the present embodiment, the ability information inquiry unit 70 inquires about ability information concerning the memory capacity with respect to other devices on the network, and the ability information memory 62 stores ability information concerning the memory capacity.

In the present embodiment, the given processing which the processing requesting unit 76 requests is memory processing which stores the printing data which was received from PC 14. Because of this, the processing requesting unit 76 determines a server device from which to request memory processing, based upon the received ability information.

Furthermore, when printing and transmission of printing data to the server device are simultaneously performed, the processing requesting unit 76 stores printing data which was transmitted from the PC 14 until there is no space in its own printing memory 50, and when there is no space in its own printing memory 50, it is controlled so as to transfer the printing data which is received to the server device in real time. Furthermore, in response to emptiness of the printing memory 50 due to printing, the transmission requesting unit 78 requests the transmission of the printing data which it previously transmitted, to the memory processing device. Furthermore, the printing controller 44 sequentially receives the printing data which was previously transferred and controls the data so as to store the data in its own printing memory.

Figure 13:
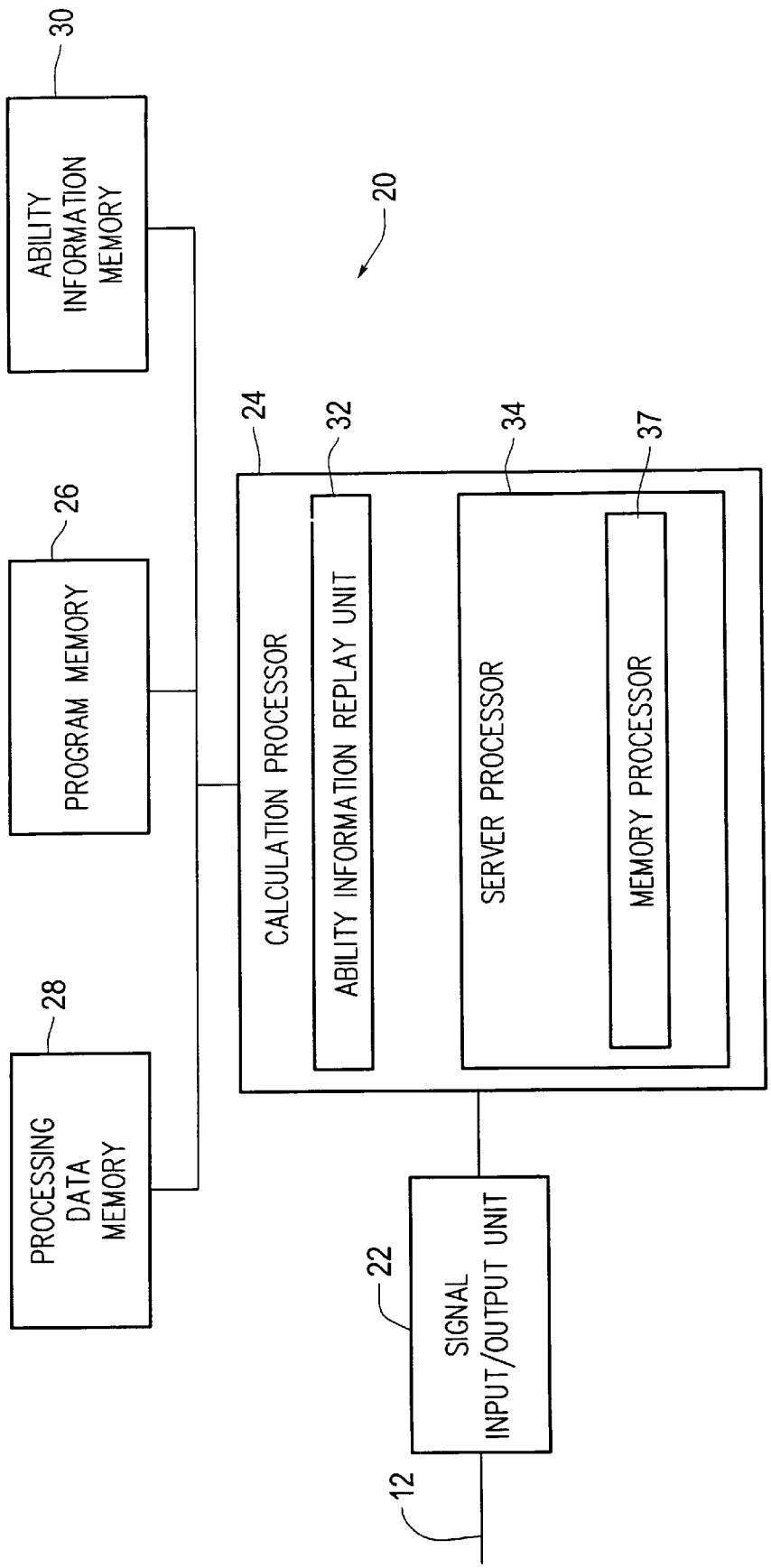
FIG. 13 is block diagram of the server device of the second embodiment.

FIG. 13 shows a functional block diagram of a device which functions as a server device, such as the server 20b. In FIG. 13, the same numbers are used for elements with the same functions as in the function block diagram of the server device of FIG. 4.

The server device of the present embodiment is structured by a signal input/output unit 22 which communicates data through the communication line 12, a calculation processor 24 which comprises a CPU or the like, a program memory 26, a processing data memory 28, and an ability information memory 30.

The processing data memory 28 stores printing data for which a memory request has been received. The ability information memory 30 stores ability information concerning its own memory capacity. The calculation processor 24 contains an ability information reply unit 32 and a server processor unit 38.

The ability information reply unit 32 replies with ability information concerning its own memory capacity which is stored in the ability information memory 30, to the client printer in response to an ability information inquiry concerning the memory capacity from the client printer.

The server processor 34 includes a memory processor 37, stores printing data which has been transmitted by the client printer to the processing data memory 28, and transmits the printing data which is stored to the client printer in response to a transmission request from the client printer.

Figure 14:
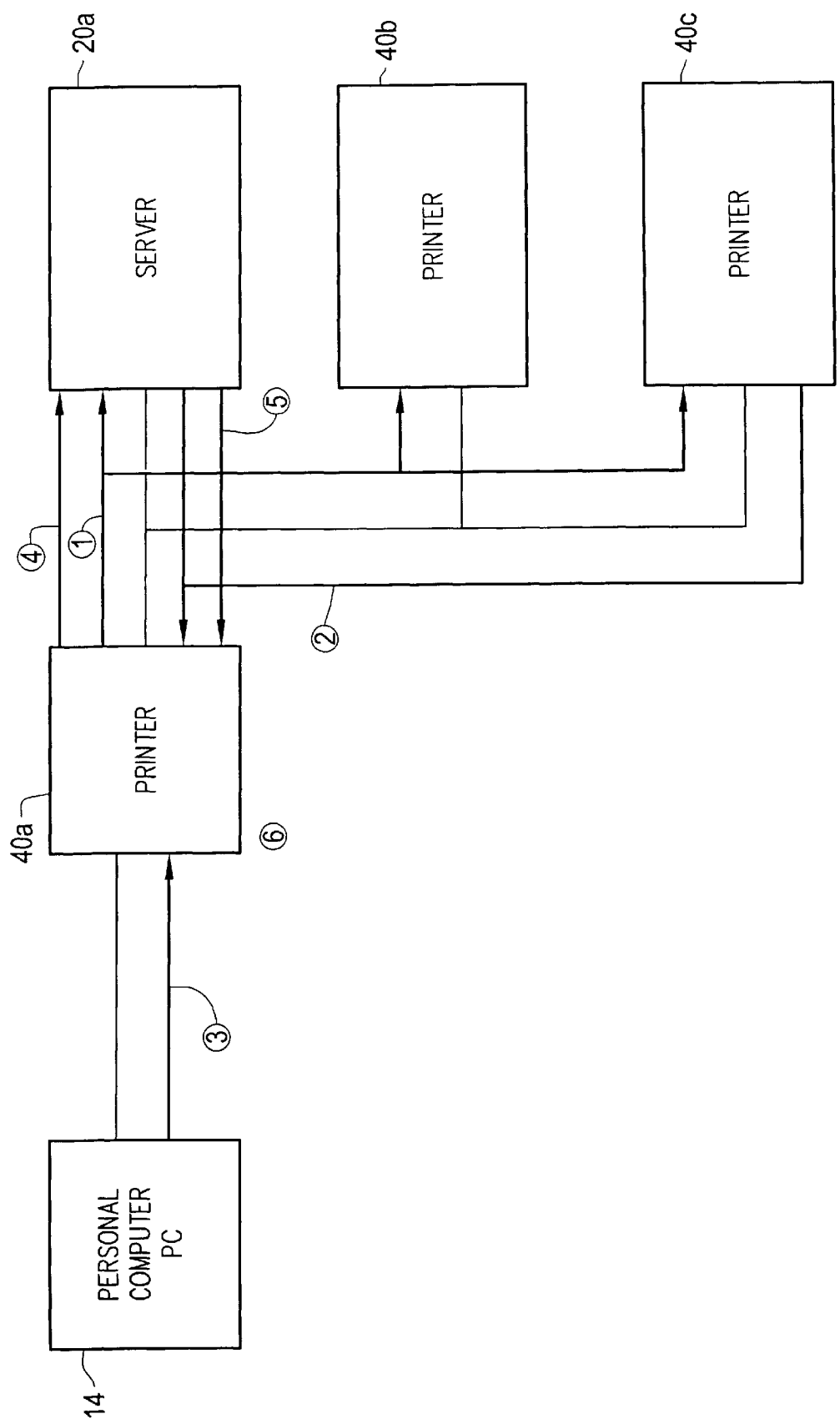
FIG. 14 is a diagram of a detailed operation example of the second embodiment.

Next, by using FIG. 14 and the flowcharts of FIGS. 7, 8 and 9, further detailed operation examples of the printer and the network system 10 of the present embodiment are explained. FIG. 14 is a diagram explaining a more detailed operation example of the printer and the network system 10 of the present embodiment.

In FIG. 14, the printer 40a which becomes a client printer is an ink jet printer and has a printer memory which only stores the printing data for one line. In this case, the PC can only transmit printing data according to the printing speed of the printer 40a, so that the release of the PC is delayed.

However, as the printer 40a requests storage of the received printing data from a memory processing device on the network 10, the PC can perform the transmission of data regardless of the printing speed of the printer 40a. The operation of the printer 40a when it determines the server device from which to request memory processing and performs the memory request, is shown in the flow 1000 of FIG. 7, flows 1112 and 1114 of FIG. 8, and 2000B of FIG. 9. Furthermore, the operation of a server device which has received the memory request is shown in 2000C of FIG. 9.

① First of all, the ability information inquiry unit 70 of the printer 40a performs an ability information inquiry concerning the memory capacity with respect to other devices on the network. (The same processing can be performed by step S11 of FIG. 7.)

② The ability information inquiry unit 70 receives the ability information from the other devices on the network in response to the inquiry, and the processing requesting unit 76 determines a server device to which to transfer printing data, based upon the ability information (steps S12 and S13 of FIG. 7). Here, the server 20a is determined as the server device.

③ PC 14 transmits printing data including a printer command, to allow the printer 40a to directly print according to its own original abilities.

④ The processing requesting unit 76 of the printer 40a transfers the printing data which was transmitted by PC 14 to the server 20a, which is a server device (step S48 of FIG. 8). Furthermore, when printing and transmission of the printing data to the server device are simultaneously performed, the processing of the flow 1114 of FIG. 8 is performed.

⑤ The server device processor 38 of the server 20a which has received a memory request, receives printing data which is transmitted by the printer 40a, stores the data in the processing data memory 28, and transmits the printing data to the printer 40a in response to a transmission request from the printer 40a (flows 2000C and 2000D of FIG. 9).

⑥ The printer 40a which receives the printing data from the server device, performs printing of the printing data (2000B of FIG. 9). Furthermore, when printing and transmission of the printing data to the memory processing device are simultaneously performed, printing of the first part of the printing data which is not transferred to the server device is performed in steps S40, S42, and S44 of FIG. 8.

According to the present embodiment, by requesting memory processing from another server device which is connected to the network, the client printer can realize a function beyond its own original memory capacity, and a printer can be realized in which the function is significantly improved with respect to the memory capacity without increasing the cost of the printer itself.

In addition, PC 14 can request printing processing from a client printer in which a memory capacity is improved. Because of this, PC 14 is not limited to the printing speed of the client printer. Therefore, transmission of data from the PC 14 to the client printer can be shortened making it possible to speed up the release of the PC 14.

(3) Third Embodiment

A characteristic of the present embodiment is to improve a function concerning an image processing execution environment by connecting a printer to a network. The function can be realized as a printer (hereafter referred to as a client printer) which receives a printing command from a personal computer (hereafter referred to as PC), transmits its own image processing program along with received printing data to another device on the network (hereafter referred to as a server device) that has an image processing execution environment, requests image processing, receives the processed data, and performs printing.

The difference between the present embodiment and the first embodiment in which image processing is requested from a server device, is that the client printer transmits the image processing program along with the printing data.

Figure 15:
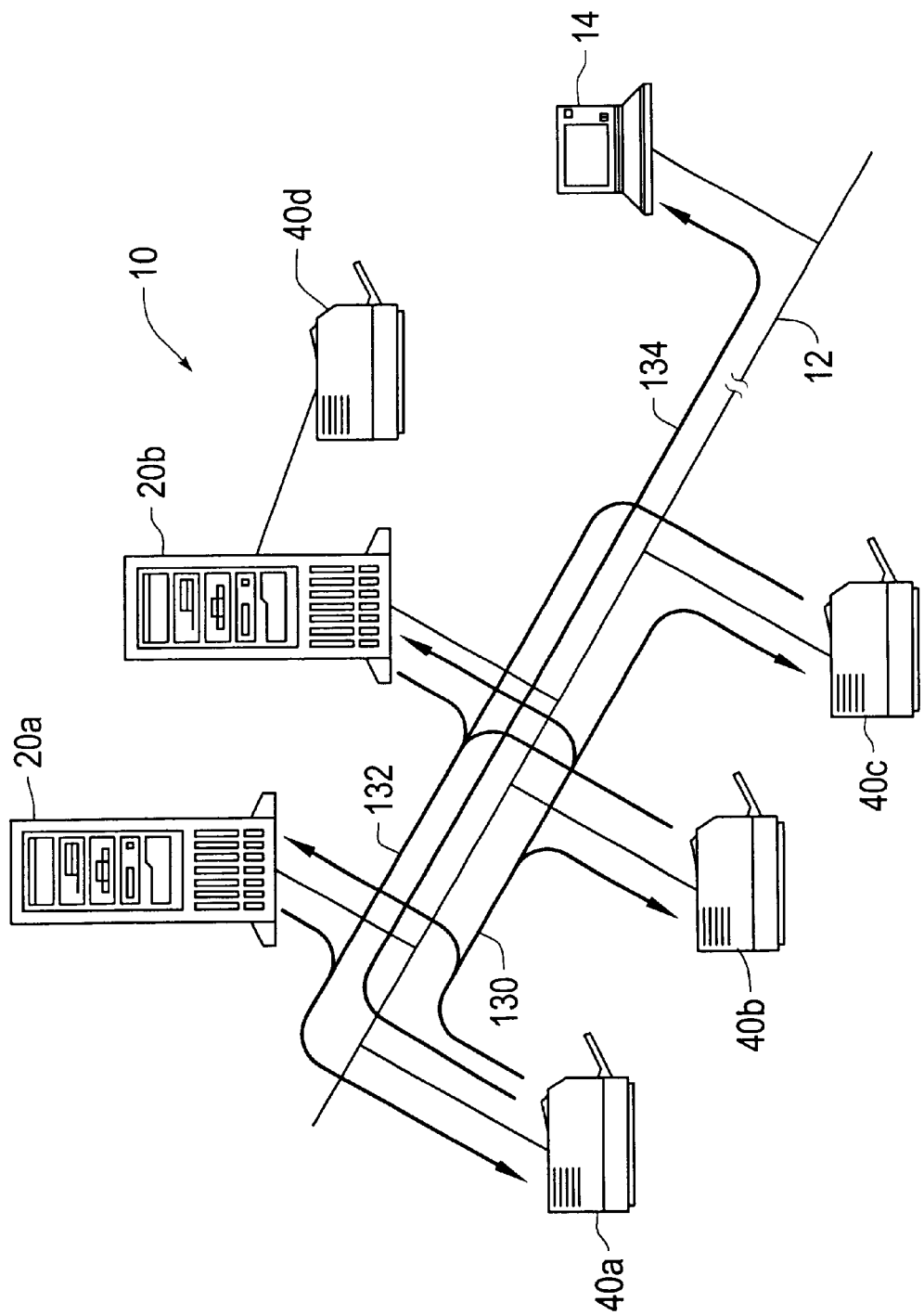
FIG. 15 is a diagram of the network system related to the third embodiment.
Figure 16:
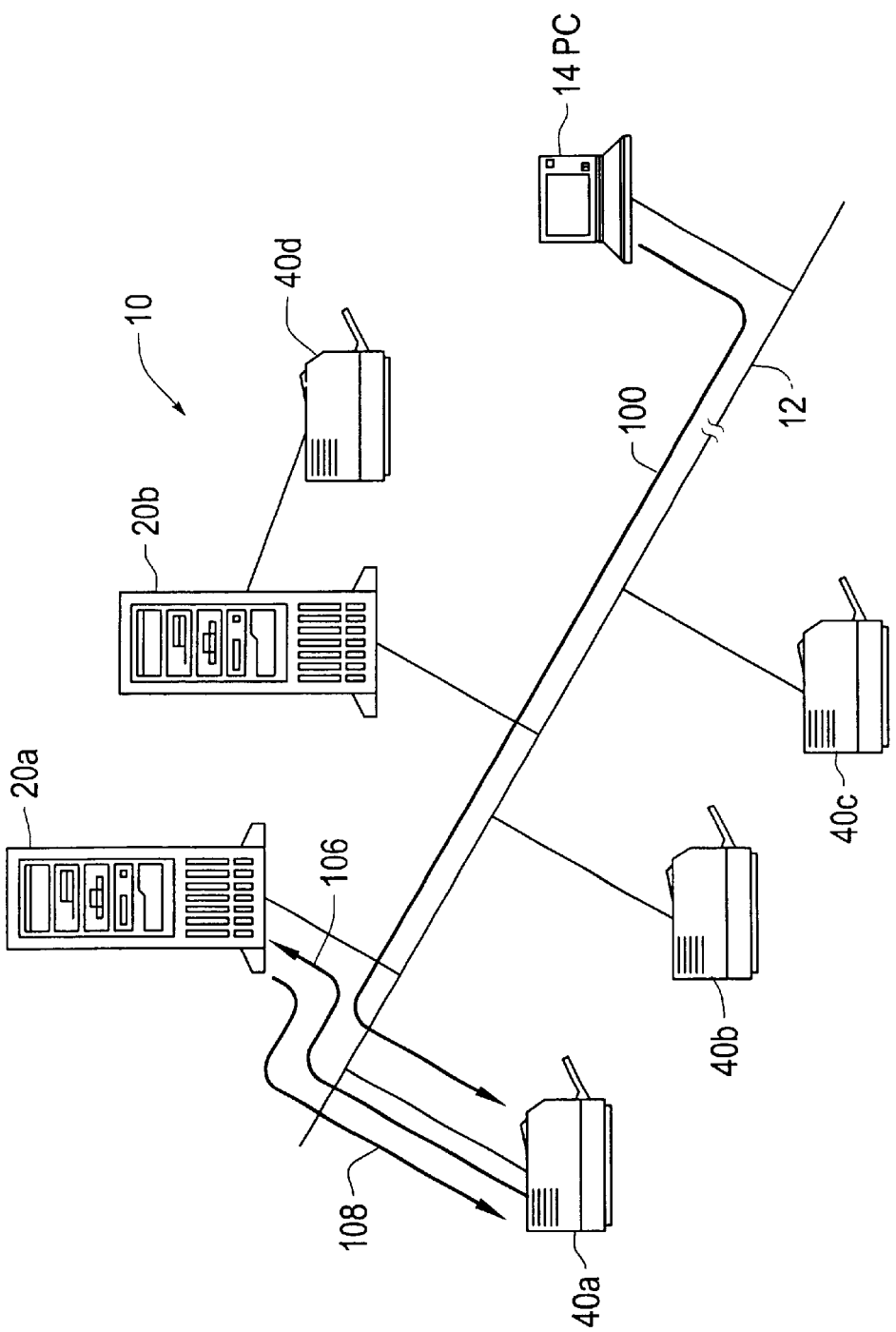
FIG. 16 is a diagram of the network system of the third embodiment.

FIGS. 15 and 16 show the structure of the third embodiment printer related to the present invention, and a network system which is connected to the printer. The equipment structure of the present embodiment is basically the same as the one in FIGS. 1 and 2. Furthermore, a device with an image processing execution environment which can function as a server device is required to be on the network.

A client printer is defined as printer 40a. As shown in FIG. 15, the printer 40a performs an ability information inquiry 130 regarding an image processing execution environment with respect to other devices 20a, 20b, 40b, 40c, or the like, which are connected to the network. In response to the ability information inquiry, the other devices 20a, 20b, 40b, 40c, or the like, which are connected to the network, reply with their own ability information 132 concerning image processing execution environment to the printer 40a.

Based upon the received ability information, the printer 40a determines a server device with an environment which can execute image processing of the printing data which was transmitted by PC 14. The server device is defined as server 20a. Furthermore, the printer 40a discloses virtual printer information 134 to PC 14, indicating that it can perform image processing which is appropriate to its own printer.

When PC 14 receives the virtual printer information 134 and determines that it is possible to perform image processing in the printer 40a, as shown in FIG. 16, the printing data 104 including the image data prior to image processing is transmitted to the printer 40a.

The printer 40a which receives the printing data 104 transfers the printing data which was received and the image processing program 106 to the server 20a and requests image processing.

When the server 20b receives the printing data and the image processing program 106, image processing is performed and the processed printing data 108 is transmitted to the printer 40a. The printer 40a performs printing, based upon the printing data 108 which is received.

Figure 17:
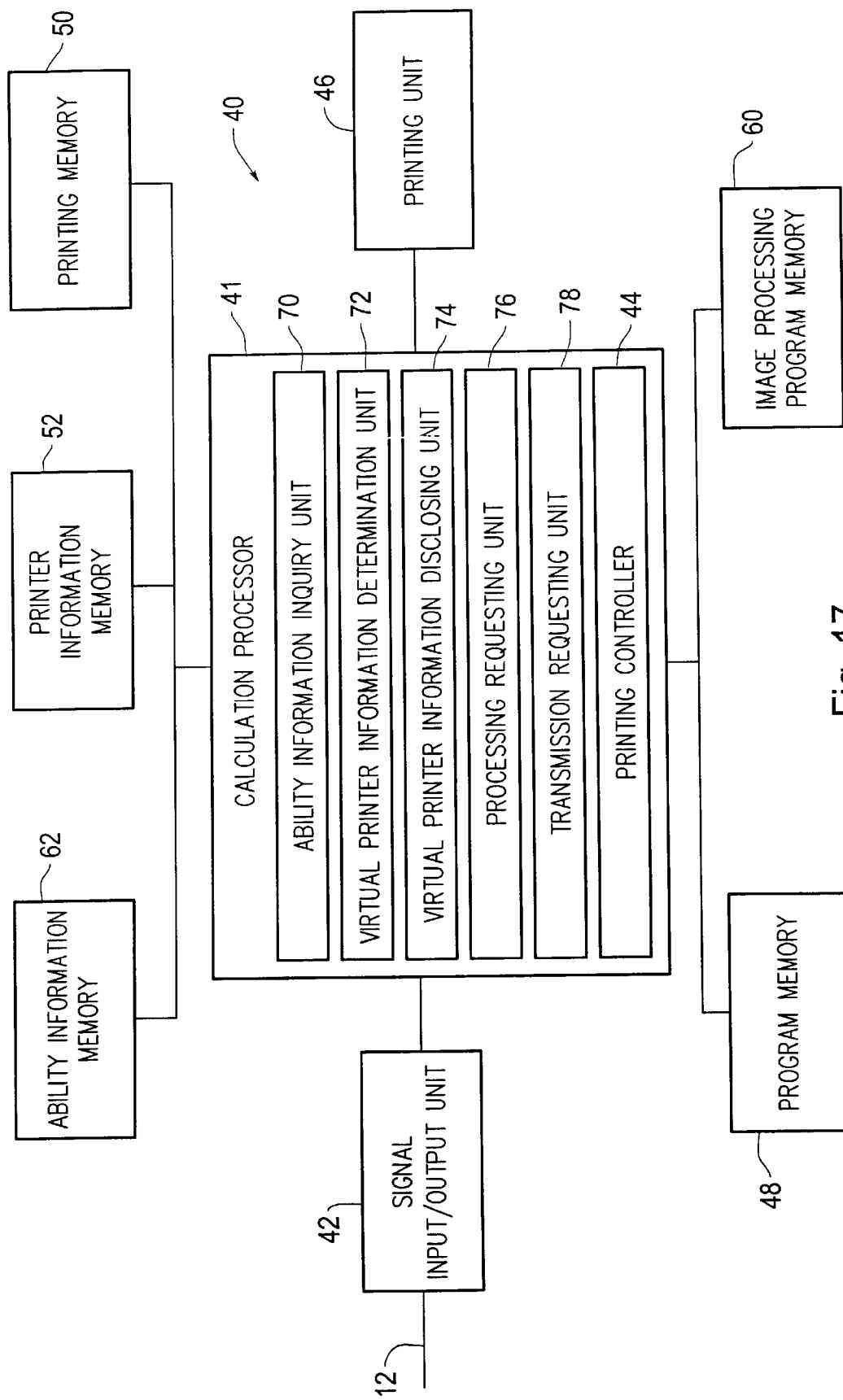
FIG. 17 is a block diagram of the client printer of the third embodiment.

FIG. 17 is a block diagram of a device which functions as a client printer, such as the printer 20a. In FIG. 17, the same numbers are used for elements with the same function as in the function block diagram of the client printer of FIGS. 3 and 12.

The client printer of the present embodiment comprises a signal input/output unit 42 which is connected to the communication line 12, calculation processor 41 comprising a CPU, or the like, a program memory 48, a printing memory 50, a printer information memory 52, an ability information memory 62, a printing unit 46 which performs printing based upon the printing data, and an image processing program memory 60.

Here, the image processing program memory 60 stores an image processing program which performs image processing which is appropriate for the printer 20.

Based upon the program which is stored in the program memory 48, the calculation processor 41 is operated and functions as an ability information inquiry unit 70, a virtual printer information determination unit 72, a virtual printer information disclosing unit 74, a processing requesting unit 76, a transmission requesting unit 78, and a printing controller 44.

In the present embodiment, the ability information inquiry unit 70 inquires about ability information concerning the image processing execution environment from other devices on the network, and the ability information memory 62 stores the ability information concerning the image processing execution environment.

In the present embodiment, the given processing that is requested by the processing requesting unit 76 is image processing of the printing data which was received from PC 14. Because of this, based upon the ability information concerning the image processing execution environment, the processing requesting unit 76 determines a server device with a sufficient image processing execution environment to perform the image processing. Furthermore, the printing data which is received from PC 14 and the image processing program which is stored in the image processing program memory 60 are transferred to the server device in real time and image processing is requested.

Furthermore, when the server device has the same image processing program as the image processing program which the printer is about to transmit, it is acceptable to have a structure in which the version information is checked, and a transmission only performed, for example, when the version information of the image processing program of the printer is shown to be newer.

Figure 18:
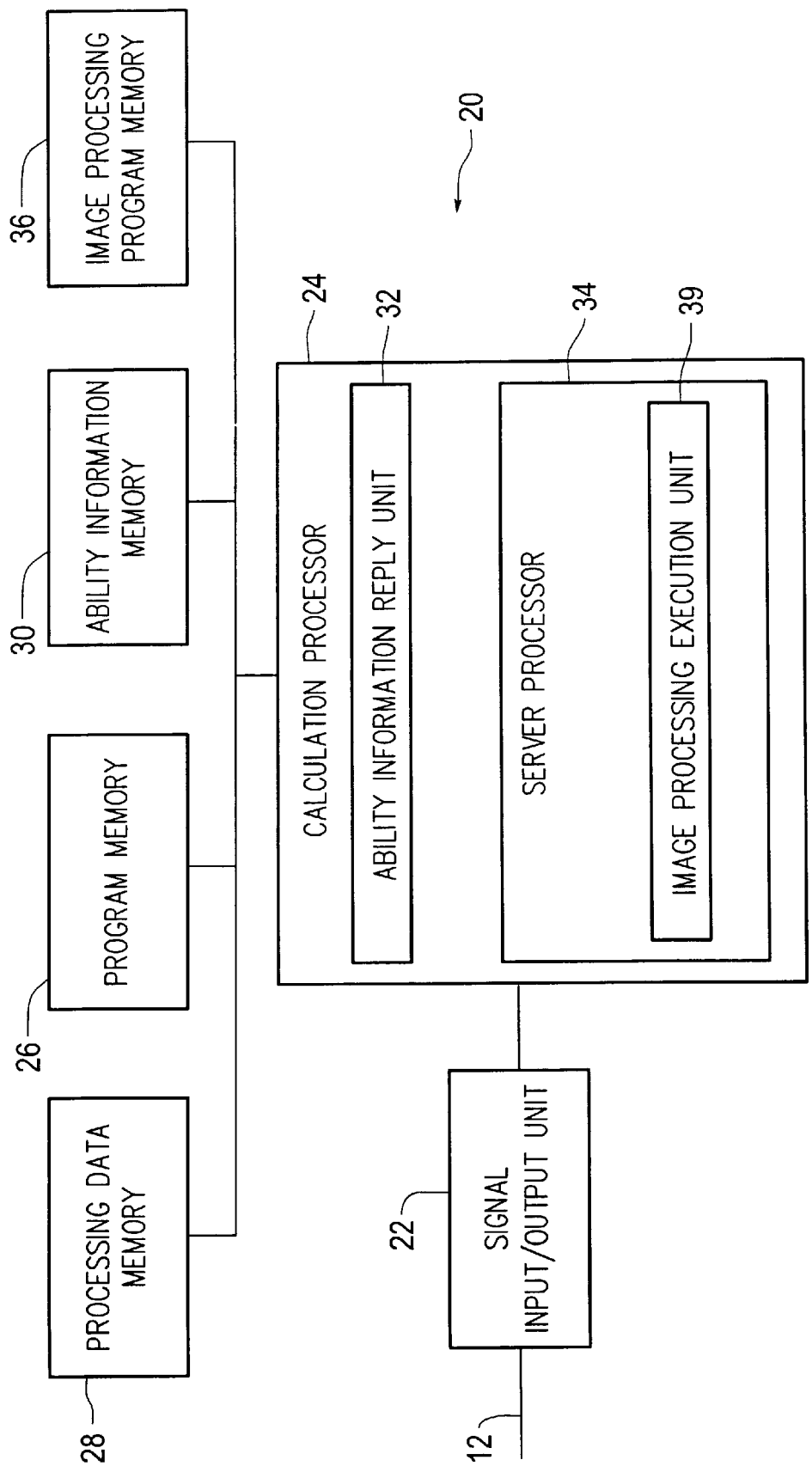
FIG. 18 is a block diagram of the server device of the third embodiment.

FIG. 18 shows a functional block diagram of a device which functions as a server device for image processing, such as the server 20b. In FIG. 18, the same numbers are used for elements with the same function as in the function block diagram of the server device of FIGS. 4 and 13.

The server device of the present embodiment comprises a signal input/output unit 22 which performs communication of data through the communication line 12, a calculation processor 24 which comprises a CPU, or the like, a program memory 26, a processing data memory 28, an image processing program memory 36, and an ability information memory 30. The processing data memory 28 stores the printing data for which an image processing request has been received, and the processed printing data.

The image processing program which is transmitted from the client printer is stored in the image processing program memory 36. The ability information memory 30 stores ability information concerning the server 20b's own image processing execution environment. The calculation processor 24 contains an ability information reply unit 32 and a server processor 34.

In response to an ability information inquiry from the client printer, the ability information reply unit 32 replies with its own ability information concerning the image processing execution environment, which is stored in the ability information memory 30.

The server processor 34 contains an image processing execution unit 39, that performs image processing of the printing data using the image processing program which was received from the client printer, and transmits the processed printing data to the client printer in response to a transmission request from the client printer.

According to the present embodiment, PC 14 can request printing from a printer which is improved in terms of the image processing execution environment. Because of this, it is not necessary to perform an image processing with a high processing load on the PC side. Therefore, it is possible, even with a printer with low processing ability, to start printing quickly without spending time for image processing.

Furthermore, because the client printer transmits the image processing program which is appropriate for its own device to another server device which is connected to the network and requests image processing execution, memory efficiency is better compared to the case when the server device has the image processing programs corresponding to all the devices.

Furthermore, needless to say, it is acceptable to implement the embodiments individually, or to combine the embodiments. When combining the embodiments, the client printer discloses the printer related function, the function concerning the memory capacity, and the function concerning the image processing execution environment, to the PC as virtual printer information, and performs conversion processing requests, memory processing requests, and image processing execution requests, to the server devices on the network as needed.

Moreover, in the embodiments, examples of providing a client printer and a server device within the network system 10 are explained. Furthermore, when a printer with a sufficiently high ability exists, it is also acceptable that the system 10 is structured so that the printer functions as a server device.

Thus, if the printer functions as a client printer in addition to a server device, the printer can function as a client printer and/or as a server device, as needed. Furthermore, the flowcharts of the operation of the printer shown in FIGS. 7, 8 and 9 are flowcharts showing the operation when the printer functions both as a client device and a server device. Moreover, the printer does not have to be an exclusive printer, and may be any device with a printing function.

The network system of the present invention is not limited to the embodiments, and various modifications are possible within the scope of the present invention.

What is claimed is:

1. A network system, comprising a printer, that receives printing commands from the network, and at least one other device, the printer comprising:
an ability information inquiry unit that queries other devices connected to the network concerning ability information including at least one of memory capacity, processing relating to a printer language, image processing, and image processing execution environment;
a virtual printer information determination unit that determines whether another device connected to the network improves the printer's functionality, based upon the ability information transmitted from the other devices connected to the network in response to the ability information inquiry, the virtual printer information determination unit determining the printer's own virtual printer information based on the improved functionality; and
a virtual printer information disclosing unit which discloses said virtual printer information to the network;

the other devices connected to the network comprising:
an ability information reply unit that replies with ability information to the printer in response to the ability information inquiry, the ability information including at least one of the other device's own memory capacity, processing relating to a printer language, image processing, and image processing executing environment, wherein,
when another device which is connected to the network has a conversion function to convert at least one of a given printer command and a printer language to at least one of a printer command and a printer language which can be processed by the printer, the virtual printer information determination unit determines virtual printer information indicating that at least one of the given printer command and the printer language can be processed by the printer, allowing the printer to receive converted printing data and perform printing based on the converted printing data, and the virtual printer information disclosing unit discloses the determined virtual printer information to the network.

2. The network system as set forth in claim 1, the printer further comprising:
a processing request unit, that upon receiving a request for printing of printing data that exceeds the printer's original processing ability, determines a server device to which to transmit the printing data based upon the ability information which was transmitted from the other devices, transmits the printing data to the server device in real time, and requests a given processing;
a transmission requesting unit that requests transmission of printing data that has undergone the given processing from the server device; and
a printing controller that controls printing of the printing data that has undergone the given processing;

the server device comprising:
a server processor that performs the given processing on the printing data which is received from the printer and transmits printing data that has undergone the given processing to the printer in response to the transmission request from the printer.

3. The network system as set forth in claim 2,
the given processing comprising:
conversion processing to convert the printing data into printing data that may be processed and printed by the printer, wherein the processing requesting unit determines the server device to perform the conversion processing based upon the printing data received and on the ability information relating to printer related functions including at least one of processing relating to the printer language and image processing;

the server processor further comprising:
a conversion processor to convert the printing data received from the printer into printing data that may be processed and printed by the printer.

4. The network system as set forth in claim 3, wherein the processing requesting unit transmits the printer's own device information to the server device when the conversion processing is requested, and the conversion processor converts the printing data into printing data that may be processed and printed by the printer, based upon the device information.

5. The network system as set forth in claim 2, wherein the given processing includes memory processing that stores the printing data received from the network, the processing requesting unit determines a server device to perform the memory processing based upon the ability information relating to the memory capacity, and the server processor includes a memory processor that receives the printing data transmitted from the printer and stores the printing data into memory.

6. The network system as set forth in claim 5, wherein the processing requesting unit stores the printing data transmitted from the computer to a printing memory, but if the printing memory is full, the processing requesting unit transfers the printing data to the server device in real time, then, when the printing memory is no longer full, the transmission requesting unit requests transmission of the printing data that was transmitted to the server device, and the printing controller controls a sequential reception of the printing data, stores the printing data in its own printing memory, and instructs the printer to print the printing data simultaneously with the transfer of printing data by the server device.

7. The network system as set forth in claim 2,
the given processing comprising:
image processing of the printing data that is received from the network;
the printer further comprising:
an image processing program memory that stores an image processing program that performs image processing on the printing data so that the printing data may be processed and printed by the printer, wherein the processing requesting unit determines a server device with an execution environment for image processing based upon the ability information relating to the image processing execution environment, and transmits the printing data and the image processing program to the server device;

the server processor further comprising:
an image processing execution environment that receives the printing data and the image processing program transmitted from the printer, and performs image processing of the printing data using the image processing program.

8. The network as set forth in claim 1, wherein the printer queries other devices connected to the network concerning ability information when at least one of the following situations occur: 1) when the printer is connected to the network, 2) when a new device connected to the network, or 3) when there is an ability information inquiry.

9. The network system as set forth in claim 1, the printer further comprising:
an ability information memory that stores ability information for each device connected to the network.

10. The network system as set forth in claim 1 wherein the printing data comprises image data, or image data and a printed command.

11. A printer, that receives printing commands from a network and is connected to the network system that includes at least one other device, comprising:
an ability information inquiry unit that queries other devices connected to the network concerning ability information including at least one of memory capacity, processing relating to a printer language, image processing, and image processing execution environment;
a virtual printer information determination unit that determines whether there is another device connected to the network that improves the printer's functionality based upon the ability information which was transmitted from the other devices connected to the network in response to the ability information inquiry, the virtual printer information determination unit determining the printer's own virtual printer information based on the improved functionality; and
a virtual printer information disclosing unit that discloses the virtual printer information to the network, wherein, when another device which is connected to the network has a conversion function to convert at least one of a given printer command and a printer language to at least one of a printer command and a printer language which can be processed by the printer, the virtual printer information determination unit determines virtual printer information indicating that at least one of the given printer command and the printer language can be processed by the printer, allowing the printer to receive converted printing data and perform printing based on the converted printing data, and the virtual printer information disclosing unit discloses the determined virtual printer information to the network.

12. The printer as set forth in claim 11, further comprising:
a processing requesting unit that upon receiving a request for printing of printing data that exceeds the printer's original processing ability, determines a server device to which to transmit the printing data based upon the ability information transmitted from the other devices, transmits the printing data to the server device in real time, and requests a given processing;
a transmission requesting unit that requests transmission of the printing data that has undergone the given processing from the server device; and
a printing controller that controls printing of printing data that has undergone the giving processing.

13. The printer as set forth in claim 12,
the given processing comprising:
conversion processing to convert the printing data into printing data that may be processed and printed by the printer, wherein the processing requesting unit determines a server device to perform conversion processing based upon the printing data received and upon the ability information relating to printer-related functions, including at least one of processing relating to a printer language and image processing.

14. The printer as set forth in claim 13, wherein the processing requesting unit transmits the printer's own device information to the server device when the given processing is requested.

15. The printer as set forth in claim 12, the given processing comprising:
memory processing that stores the printing data which is received from the network, wherein the processing requesting unit determines a server device to perform the memory processing, based upon the ability information relating to the memory capacity.

16. The printer as set forth in claim 15, wherein the processing requesting unit stores the printing data transmitted from the computer to a printing memory, but if the printing memory is full, the processing requesting unit transfers the printing data to the server device in real time, then, when the printing memory is no longer full, the transmission requesting unit requests transmission of the printing data that was transmitted to the server device, and the printing data in its own printing memory, and instructs the printer to print the printing data simultaneously with the transfer of printing data by the server device.

17. The printer as set forth in claim 12,
the given processing comprising:
image processing of the printing data that is received from the network;
the printer further comprising:
an image processing program memory that stores an image processing program that performs image processing on the printing data so that the printing data may be processed and printed by the printer, where in the processing requesting unit determines a server device with an execution environment for the image processing based upon the ability information relating to the image processing execution environment, and transmits the printing data and the image processing program to the server device.

18. The printer as set forth in of claim 11, wherein the printer queries other devices connected to the network concerning ability information when at least one of the following situations occur: 1) when the printer is connected to the network, 2) when a new device is connected to the network, or 3) when there is an ability information inquiry.

19. The printer as set forth in claim 11, further comprising:
an ability information memory that stores ability information for each device connected to the network.

20. The printer as set forth in claim 12, further comprising;
an ability information reply unit that replies with ability information including at least one of the printer's own memory capacity, processing relating to a printer language, image processing, and image processing execution environment in response to an ability information inquiry from another device connected to the network; and a server processor that performs a given processing on printing data received from another printer connected to the network, and transmits the printing data that has undergone the given processing to the other printer in response to a transmission request from the other printer.

21. The printer as set forth in claim 20, the server processor comprising:
a conversion processor that converts the printing data which was received from the other printer into printing data that may be processed and printed by the other printer.

22. The printer as set forth in claim 21, wherein the conversion processor converts the printing data into printing data that may be processed and printed by the other printer, based upon the device information which was received from the other printer.

23. The printer as set forth in claim 20, the server processor further comprising:
a memory processor that receives printing data transmitted from the other printer and stores the printing data into the printer's own memory.

24. The printer as set froth in claim 20, the server processor further comprising:
an image processing execution unit that receives the printing data and the image processing program transmitted from the other device and processes the printing data using the image processing program.

25. The printer as set forth in claim 11, wherein the printing data comprises image data, or image data and a printer command.

26. An information memory medium on which is recorded information to control a printer which can receive a printing command from a network system including at least one other device, comprising;
information for querying other devices connected to the network concerning ability information regarding at least one of memory capacity, processing relating to a printer language, image processing, and image processing execution environment;
information for determining whether another device improves the printer's own functionality based upon the ability information that is transmitted from the other devices connected to the network in response to the ability information inquiry, and determining the printer's own virtual printer information based on the improved functionality;
information for disclosing the virtual printer information to the network; and,
when another device which is connected to the network has a conversion function to convert at least one of a given printer command and a printer language to at least one of a printer command and a printer language which can be processed by the printer, virtual printer information indicating that at least one of the given printer command and the printer language can be processed by the printer, allowing the printer to receive converted printing data and perform printing based on the converted printing data.

* * * * *